United States Patent
Nick et al.

(10) Patent No.: US 12,410,912 B2
(45) Date of Patent: Sep. 9, 2025

(54) SHADOWLESS LIGHTING SYSTEM FOR A HANDHELD POWER TOOL

(71) Applicant: MILWAUKEE ELECTRIC TOOL CORPORATION, Brookfield, WI (US)

(72) Inventors: Mackenzie J. Nick, Theresa, WI (US); Benjamin J. Farley, Milwaukee, WI (US); Kentez L. Craig, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/699,728

(22) PCT Filed: Nov. 1, 2022

(86) PCT No.: PCT/US2022/048534
§ 371 (c)(1),
(2) Date: Apr. 9, 2024

(87) PCT Pub. No.: WO2023/086237
PCT Pub. Date: May 19, 2023

(65) Prior Publication Data
US 2024/0410564 A1 Dec. 12, 2024

Related U.S. Application Data

(60) Provisional application No. 63/321,896, filed on Mar. 21, 2022, provisional application No. 63/278,719, filed on Nov. 12, 2021.

(51) Int. Cl.
*F21V 23/00* (2015.01)
*F21V 33/00* (2006.01)
*F21Y 115/10* (2016.01)

(52) U.S. Cl.
CPC ........ *F21V 33/0084* (2013.01); *F21V 23/001* (2013.01); *F21Y 2115/10* (2016.08)

(58) Field of Classification Search
CPC .. F21Y 2115/10; B25B 23/18; F21V 33/0084; H02K 7/145; H01R 39/64; B23Q 17/2404; F21L 13/00; F21S 9/04
See application file for complete search history.

(56) References Cited

U.S. PATENT DOCUMENTS 2,310,166 A 2/1943 Way
2,525,588 A 10/1950 Cameron et al.
(Continued)

FOREIGN PATENT DOCUMENTS

CN 201201230 Y 3/2009
CN 201470941 U 5/2010
(Continued)

OTHER PUBLICATIONS

Search English translation of DE-102012205274-A1 (Year: 2013).*
(Continued)

*Primary Examiner* — Omar Rojas Cadima
(74) *Attorney, Agent, or Firm* — Michael Best & Friedrich LLP

(57) ABSTRACT

One example power tool includes a primary housing. A motor may be situated within the primary housing. The power tool may further include a transmission mechanism configured to transmit rotational energy from the motor to an output unit of the power tool. The power tool may further include a secondary housing in which at least a portion of the transmission mechanism is located. The power tool may further include a light source mounted to a front end of the secondary housing. The power tool may include one or more wires that extend through the passageway and that are electrically connected to the light source.

20 Claims, 26 Drawing Sheets

(56) References Cited

U.S. PATENT DOCUMENTS

| | | | |
|---|---|---|---|
| 5,267,129 A | 11/1993 | Anderson | |
| 6,494,590 B1 | 12/2002 | Paganini et al. | |
| 6,886,961 B2 | 5/2005 | Hara et al. | |
| 6,981,779 B2 | 1/2006 | Fukuoka | |
| 7,137,761 B2 | 11/2006 | Hara et al. | |
| 7,185,998 B2 | 3/2007 | Oomori et al. | |
| 7,253,541 B2 | 8/2007 | Kovarik et al. | |
| 7,677,752 B2 | 3/2010 | Tadokoro et al. | |
| 7,850,325 B2 | 12/2010 | Wall et al. | |
| 7,934,847 B2 | 5/2011 | Oomori et al. | |
| 8,075,155 B2 | 12/2011 | Watanabe et al. | |
| 8,317,350 B2 | 11/2012 | Friedman et al. | |
| 8,328,308 B2 | 12/2012 | Kurashina | |
| 8,328,381 B2 | 12/2012 | Dixon et al. | |
| 8,446,120 B2 | 5/2013 | Forster et al. | |
| 8,496,366 B2 | 7/2013 | Leong | |
| 8,506,108 B2 | 8/2013 | Friedman et al. | |
| 8,517,558 B2 | 8/2013 | Oomori et al. | |
| 8,616,300 B2 | 12/2013 | Suzuki et al. | |
| 8,653,787 B2 | 2/2014 | Cunanan et al. | |
| 8,796,995 B2 | 8/2014 | Cunanan et al. | |
| 8,820,955 B2 | 9/2014 | Dixon et al. | |
| 8,827,483 B2 | 9/2014 | Dixon et al. | |
| 8,833,485 B2 | 9/2014 | Svennung et al. | |
| 8,981,680 B2 | 3/2015 | Suda et al. | |
| 8,988,015 B2 | 3/2015 | Forster et al. | |
| 9,000,882 B2 | 4/2015 | Velderman et al. | |
| 9,028,088 B2 | 5/2015 | Vanko et al. | |
| 9,071,069 B2 | 6/2015 | Brotto et al. | |
| 9,114,512 B2 | 8/2015 | Beer et al. | |
| 9,138,846 B2 | 9/2015 | Svennung et al. | |
| 9,209,642 B2 | 12/2015 | Cunanan et al. | |
| 9,225,275 B2 | 12/2015 | Sterling et al. | |
| 9,289,832 B2 | 3/2016 | Kishima et al. | |
| 9,302,376 B2 | 4/2016 | Agehara et al. | |
| 9,328,915 B2 | 5/2016 | Vanko et al. | |
| 9,352,458 B2 | 5/2016 | Friedman et al. | |
| 9,401,250 B2 | 7/2016 | Velderman et al. | |
| 9,406,457 B2 | 8/2016 | Velderman et al. | |
| 9,413,088 B2 | 8/2016 | Brotto et al. | |
| 9,444,269 B2 | 9/2016 | Wohltmann et al. | |
| 9,458,996 B2 | 10/2016 | Francis et al. | |
| 9,461,379 B2 | 10/2016 | Cunanan et al. | |
| 9,481,081 B2 | 11/2016 | Hecht et al. | |
| 9,508,498 B2 | 11/2016 | Forster et al. | |
| 9,539,691 B2 | 1/2017 | Hirschburger | |
| 9,561,548 B2 | 2/2017 | Kishima et al. | |
| 9,570,822 B2 | 2/2017 | Cunanan et al. | |
| 9,573,257 B2 | 2/2017 | Kynast et al. | |
| 9,644,837 B2 | 5/2017 | Vanko et al. | |
| 9,692,157 B2 | 6/2017 | Brotto et al. | |
| 9,722,334 B2 | 8/2017 | Sterling et al. | |
| 9,844,849 B2 | 12/2017 | Hayashi et al. | |
| 9,878,435 B2 | 1/2018 | Ito | |
| 9,914,204 B2 | 3/2018 | Hosking | |
| 9,960,509 B2 | 5/2018 | Sterling et al. | |
| 9,966,774 B2 | 5/2018 | Wohltmann et al. | |
| 10,027,140 B2 | 7/2018 | Cunanan et al. | |
| 10,040,181 B2 | 8/2018 | Fu et al. | |
| 10,052,733 B2 | 8/2018 | Ely et al. | |
| 10,256,697 B2 | 4/2019 | Velderman et al. | |
| 10,272,548 B2 | 4/2019 | Wei et al. | |
| 10,486,291 B2 | 11/2019 | Bartoszek | |
| 10,486,296 B2 | 11/2019 | Ito | |
| 10,525,582 B2 | 1/2020 | Qiu et al. | |
| 10,543,588 B2 | 1/2020 | Vanko et al. | |
| 10,651,706 B2 | 5/2020 | Forster et al. | |
| 10,666,068 B2 | 5/2020 | Cunanan et al. | |
| 10,686,319 B2 | 6/2020 | Wohltmann et al. | |
| 10,749,353 B2 | 8/2020 | Tsuruta et al. | |
| 10,821,595 B2 | 11/2020 | Qiu et al. | |
| 10,836,019 B2 | 11/2020 | Matsushita et al. | |
| 10,926,368 B2 | 2/2021 | Chellew | |
| 10,960,509 B2 | 3/2021 | Ely et al. | |
| 11,090,786 B2 | 8/2021 | Puzio | |
| 11,095,239 B2 | 8/2021 | Delose et al. | |
| 11,278,973 B2 | 3/2022 | Nagasaka et al. | |
| 2006/0104085 A1 | 5/2006 | Walker et al. | |
| 2006/0262519 A1 | 11/2006 | Hirschburger et al. | |
| 2007/0256914 A1 | 11/2007 | Lohr et al. | |
| 2008/0074865 A1* | 3/2008 | Lutz | B25B 23/18 |
| | | | 362/119 |
| 2010/0072833 A1 | 3/2010 | Canino et al. | |
| 2011/0058356 A1 | 3/2011 | Friedman et al. | |
| 2014/0232326 A1 | 8/2014 | Wohltmann et al. | |
| 2014/0262394 A1 | 9/2014 | Scott et al. | |
| 2019/0070720 A1 | 3/2019 | Rabe et al. | |
| 2020/0047322 A1 | 2/2020 | Ito | |
| 2020/0101587 A1 | 4/2020 | Niwa | |
| 2020/0114499 A1 | 4/2020 | Vanko et al. | |
| 2020/0130164 A1 | 4/2020 | Qiu et al. | |
| 2020/0198100 A1* | 6/2020 | Schneider | B25B 21/02 |
| 2020/0235638 A1 | 7/2020 | Velderman | |
| 2020/0295579 A1 | 9/2020 | Wohltmann et al. | |
| 2021/0122017 A1 | 4/2021 | Kelly | |
| 2021/0222866 A1 | 7/2021 | Niwa | |
| 2021/0260733 A1 | 8/2021 | Fischer et al. | |
| 2022/0009064 A1 | 1/2022 | Puzio | |
| 2023/0366533 A1 | 11/2023 | Chikaraishi et al. | |
| 2024/0058937 A1 | 2/2024 | Chikaraishi et al. | |
| 2024/0075609 A1 | 3/2024 | Zhao et al. | |

FOREIGN PATENT DOCUMENTS

| | | | |
|---|---|---|---|
| CN | 103231350 A | 8/2013 | |
| CN | 204209605 U | 3/2015 | |
| CN | 204470650 U | 7/2015 | |
| CN | 105798356 A | 7/2016 | |
| CN | 205765866 U | 12/2016 | |
| CN | 106393010 A | 2/2017 | |
| CN | 205938750 U | 2/2017 | |
| CN | 106475977 A | 3/2017 | |
| CN | 106625452 A | 5/2017 | |
| CN | 206344094 U | 7/2017 | |
| CN | 206605460 U | 11/2017 | |
| CN | 208867076 U | 5/2019 | |
| CN | 208961941 U | 6/2019 | |
| CN | 110170953 A | 8/2019 | |
| CN | 210173433 U | 3/2020 | |
| CN | 214418661 U | 10/2021 | |
| CN | 216030486 U | 3/2022 | |
| DE | 102011075663 A1 | 11/2012 | |
| DE | 102012009981 A1 | 11/2012 | |
| DE | 102011103656 A1 | 12/2012 | |
| DE | 102012205274 A1 * | 10/2013 | B25F 5/00 |
| DE | 102012211580 A1 | 1/2014 | |
| DE | 102015214522 A1 | 2/2017 | |
| DE | 102015226420 A1 | 6/2017 | |
| EP | 3473383 A1 | 4/2019 | |
| EP | 3015224 B1 | 4/2020 | |
| EP | 3212359 A1 | 1/2024 | |
| JP | 2001057293 A | 2/2001 | |
| JP | 2019025636 A | 2/2019 | |
| TW | M487960 U * | 10/2014 | |
| WO | 2013136917 A1 | 9/2013 | |
| WO | 2019052920 A1 | 3/2019 | |
| WO | 2019170331 A1 | 9/2019 | |
| WO | 2021252702 A1 | 12/2021 | |
| WO | 2023086237 A1 | 5/2023 | |

OTHER PUBLICATIONS

Search English translation of TW-M487960-U (Year: 2014).*
U.S. Appl. No. 18/602,954, filed Mar. 12, 2024, by Nick et al. (Copy not submitted herewith pursuant to the waiver of 37 C.F. R. § 1.98(a)(2)(iii) issued by the Office on Oct. 19, 2004).
International Search Report and Written Opinion for Application No. PCT/US2022/048534 dated Mar. 9, 2023 (12 pages).

* cited by examiner

SHADOWLESS LIGHTING SYSTEM FOR A HANDHELD POWER TOOL

CROSS-REFERENCE TO RELATED APPLICATIONS

This application is a national phase filing under 35 U.S.C. § 371 of International Application No. PCT/US2022/048534, filed Nov. 1, 2022, which claims priority to U.S. Provisional Application No. 63/321,896 filed Mar. 21, 2022, and to U.S. Provisional Application No. 63/278,719 filed Nov. 12, 2021, the entire contents of all of which are incorporated herein by reference.

FIELD OF THE INVENTION

Some disclosed embodiments relate to a handheld power tool that includes a lighting assembly. Specifically, some disclosed embodiments relate to a handheld power tool that includes a shadowless lighting system.

SUMMARY

Handheld power tools may include one or more work lights configured to illuminate a working area of the power tool. For example, a power tool may include a single work light positioned near an output unit of the power tool to illuminate an area on which the output unit is providing an output to, for example, drill into a work piece, secure a fastener in a work piece, or the like.

Some power tools may include a work light located on a front surface of the power tool configured to illuminate a working area of the power tool. For example, a high-torque impact wrench may include a single light-emitting diode (LED) positioned near an output unit that is configured to transfer rotational energy from the high-torque impact wrench to a fastener. While the high-torque impact wrench is being operated by a user, the LED may illuminate the fastener so that the user can more easily see the fastener. However, using a single LED may cause a shadow to be cast by the output unit, which can negatively affect the visibility of the fastener. To address this problem, a power tool may include multiple LEDs positioned radially around the output unit or end tool of the power tool. Providing multiple LEDs around the output unit creates even lighting applied to all sides of the output unit or end tool, which prevents shadows from being cast. This type of lighting may be generally referred to as shadowless lighting.

While shadowless lighting helps to improve the visibility of the fastener, implementing shadowless lighting in a power tool (e.g., on a front surface of a hammer case) can raise additional issues. For example, each LED mounted to the front surface of the power tool may require multiple wires to provide power and/or control signals to the LEDs. As more LEDs are included, more wires may be needed. Therefore, power tools implementing shadowless lighting require an efficient method to locate these wires in the limited space provided within a handheld power tool.

One embodiment provides a power tool that may include a primary housing. A motor may be situated within the primary housing. The power tool may further include a transmission mechanism configured to transmit rotational energy from the motor to an output unit of the power tool. The power tool may further include a secondary housing in which at least a portion of the transmission mechanism is located. The secondary housing may include an outer peripheral surface and a protrusion protruding outwardly from the outer peripheral surface. The power tool may further include a light source mounted to a front end of the secondary housing. The power tool may further include a passageway through the secondary housing. The passageway may include a first end at the front end of the secondary housing and a second end at a rear end of the secondary housing. At least part of the passageway may be located in the protrusion. The power tool may include one or more wires electrically connected to the light source. The one or more wires may extend through the passageway. The second end of the passageway may be open to an interior of the primary housing to direct the one or more wires into the primary housing.

Another embodiment provides a power tool that may include a primary housing. A motor may be situated within the primary housing. The power tool may further include a transmission mechanism configured to transmit rotational energy from the motor to an output unit of the power tool. The power tool may further include a secondary housing configured to house the transmission mechanism. The power tool may further include a light source mounted to a front end of the secondary housing. The power tool may further include a passageway through the secondary housing. The power tool may further include one or more wires electrically connected to the light source. The one or more wires may extend through the passageway.

Another embodiment provides a method of assembling a power tool. The method may include providing a primary housing, and situating a motor within the primary housing. The method may further include providing a secondary housing, and situating a transmission mechanism configured to transmit rotational energy from the motor to an output unit of the power tool within the secondary housing. The secondary housing may include a passageway. The method may further include mounting a light source to a front end of the secondary housing. The method may further include inserting one or more wires configured to be electrically connected to the light source through the passageway such that at least a portion of the one or more wires is located in the passageway.

Another embodiment provides a power tool that may include a primary housing. A motor may be situated within the primary housing. The power tool may further include a transmission mechanism configured to transmit rotational energy from the motor to an output unit of the power tool. The power tool may further include a secondary housing configured to house the transmission mechanism. The power tool may further include a light holding device mounted to a front end of the secondary housing. The power tool may further include a light source configured to be held by the light holding device. The power tool may further include a cover configured to cover at least a portion of a front surface of the light holding device. The secondary housing may include a first groove on a front surface of the secondary housing. The first groove may be configured to receive a rearwardly protruding part of the cover that protrudes further rearward than a main portion of the light holding device. The secondary housing may include a neck portion that includes a shoulder on an outer peripheral surface of the neck portion. The shoulder may be configured to receive an overhanging part of the cover that protrudes radially closer to an output axis of the output unit than the front surface of the light holding device.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
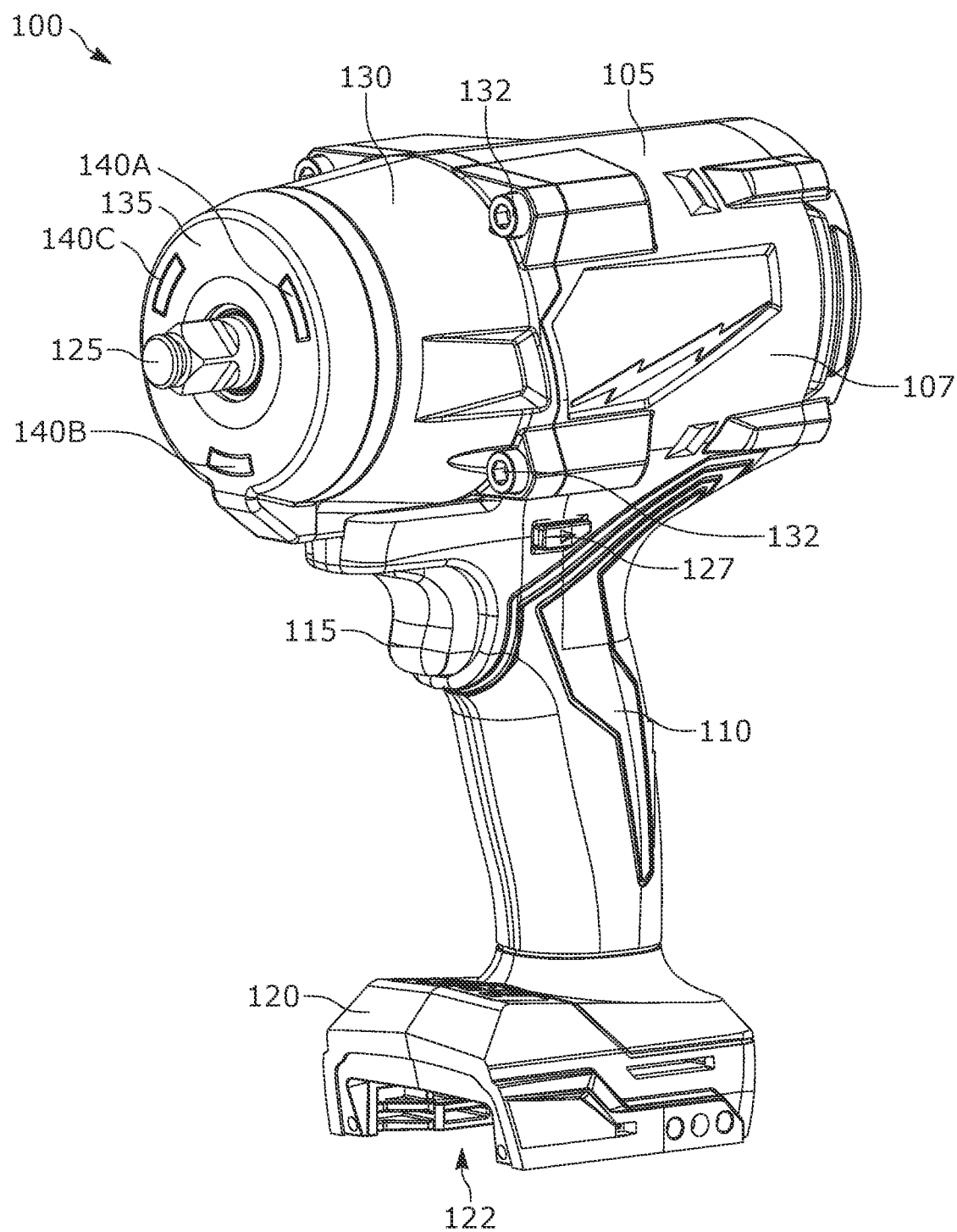
FIG. 1 illustrates a power tool that includes a shadowless lighting system, according to some embodiments described herein.

FIG. 1 illustrates a power tool 100 that includes a shadowless lighting system according to one example embodiment. The power tool 100 includes a primary housing 105. The primary housing 105 may be a main body of the power tool 100. The primary housing 105 may be configured to house a brushless direct current (BLDC) motor in an upper portion 107 of the primary housing 105. Accordingly, the primary housing 105 (in particular, the upper portion 107 of the primary housing 105) may also be referred to as a motor housing. In some embodiments, the primary housing 105 is formed from two pieces of plastic configured to mate (e.g., a clamshell housing), such that an interior cavity is formed within the primary housing 105. A portion of the primary housing 105 may be formed into a handle 110 to allow a user to hold the power tool 100. A trigger 115 may be positioned on the handle 110 to allow a user to actuate the trigger 115 to variably control at least one parameter of the power tool 100. In some embodiments, the parameter may be an amount of power supplied to a motor of the power tool 100. The primary housing 105 may further include a connection portion 120 (i.e., a foot portion of the power tool 100) that may include an interface 122 (i.e., a battery pack interface 122) configured to removably couple to a battery pack (not shown). The interface 122 may include electrical contacts to allow power to be transferred from the battery pack to the power tool 100 (e.g., to provide power to the motor and other components of the power tool 100). The power tool 100 further includes an output unit 125 on one end of the upper portion 107 of the primary housing 105 to provide an output of the power tool. For example, the output of the power tool may be a rotational output, an impacting output, a reciprocating output, etc. In some embodiments, the output unit 125 may include a fitting (e.g., a chuck, a collet, or the like) to removably couple an end tool (e.g., a tool bit) to the output unit 125. In other embodiments, the output unit 125 may be formed such that a fastener directly removably couples to the output unit 125 to perform a loosening or tightening operation of the fastener. In some embodiments, the power tool 100 includes a forward/reverse switch 127 configured to allow a user to select a rotational direction of the output unit 125.

The power tool 100 further includes a secondary housing 130 separate from the primary housing 105. The secondary housing 130 may be configured to house a transmission mechanism of the power tool 100 configured to transmit rotational energy from a motor of the power tool 100 to the output unit 125. In some embodiments, the secondary housing 130 is a gear case, a hammer case, or the like. The secondary housing 130 may be made of metal. The secondary housing 130 may be positioned such that an end surface of the secondary housing 130 contacts at least a portion of an end surface of the primary housing 105. For example, as shown in FIG. 1, a rear end of the secondary housing 130 may be fastened to a front end of the upper portion 107 of the primary housing 105 using fasteners 132. The secondary housing 130 is described in further detail with respect to FIGS. 4A and 4B.

The power tool 100 further includes a retaining portion 135 configured to retain one or more light sources of the power tool 100. In some embodiments, the retaining portion 135 is configured to surround the output unit 125. The retaining portion 135 may include one or more lenses 140 to allow for one or more light sources to emit light through the retaining portion 135. In some embodiments, the one or more light sources may be light-emitting diodes (LEDs) arranged about a center point of the retaining portion 135 (i.e., arranged about a output axis of the output unit 125). The retaining portion 135 is described in further detail with respect to FIGS. 5A-5E. While referred to as the retaining portion 135, the retaining portion 135 may also be referred to as a lighting assembly 135.

The particular power tool 100 illustrated and described herein (e.g., an impact wrench) is merely an example. The lighting assembly 135 and associated wire routing designs disclosed herein may also be implemented on other types of power tools (e.g., a power drill, a hammer drill, an impact driver, etc.).

Figure 2:
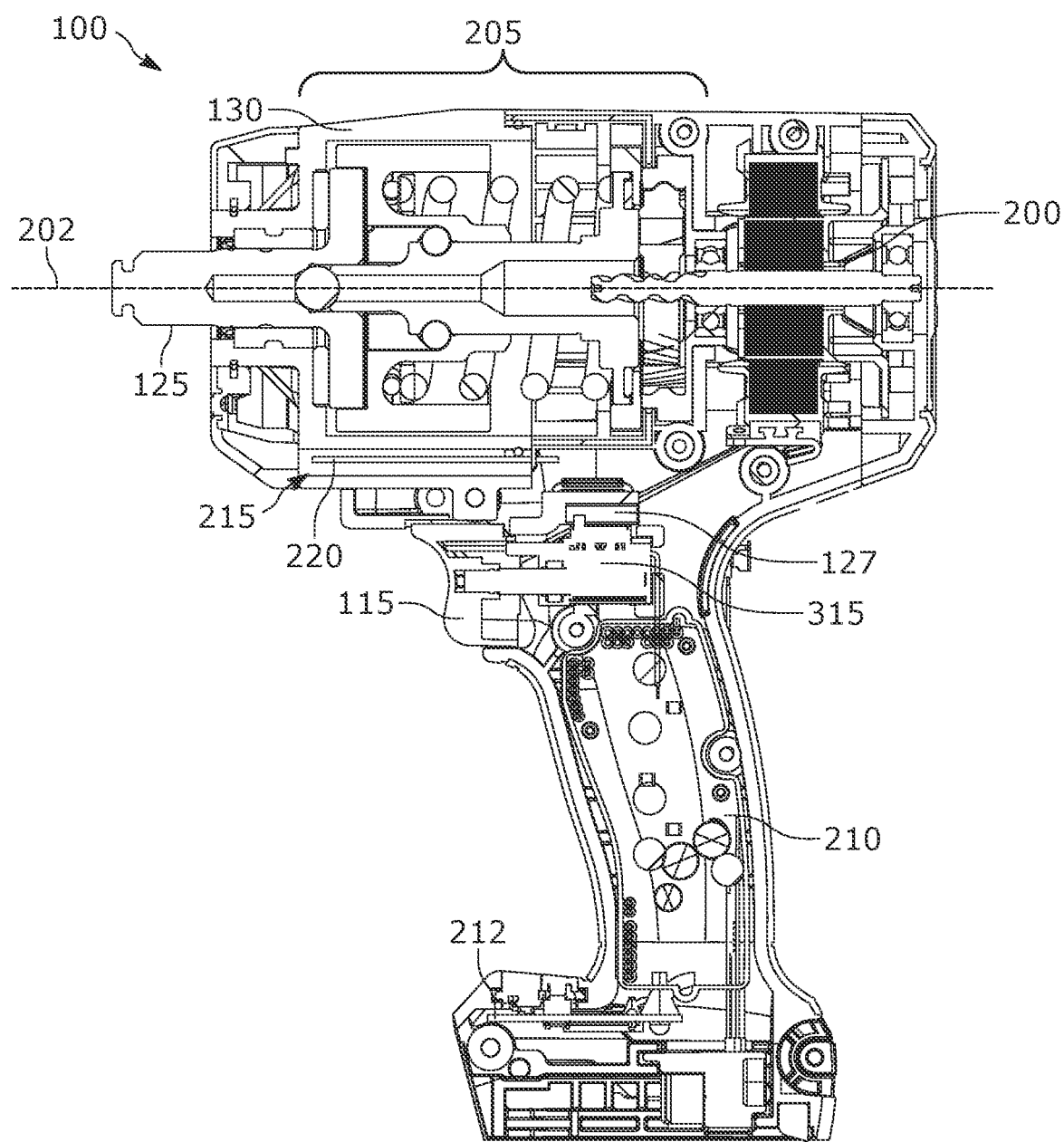
FIG. 2 illustrates a cross-sectional view of the power tool of FIG. 1, according to some embodiments described herein.

FIG. 2 illustrates a cross-sectional view of the power tool 100 according to one example embodiment. The power tool 100 includes a motor 200 configured to provide a rotational output about an axis 202 (i.e., a motor axis or output axis). The power tool 100 further includes a transmission mechanism 205 (i.e., transmission device 205) configured to transfer the rotational output of the motor 200 to the output unit 125. The transmission mechanism 205 may be a gear transmission mechanism, an electronic transmission mechanism, an impacting transmission mechanism, a combination of multiple types of transmission mechanism, or the like. At least a portion of the transmission mechanism 205 may be positioned within the secondary housing 130.

In some embodiments, the transmission mechanism of the power tool 100 includes an impact mechanism that includes hammer with outwardly extending lugs and an anvil with outwardly extending lugs. The anvil may be coupled to the output unit 125. During operation, impacting occurs when the anvil encounters a certain amount of resistance, e.g., when driving a fastener into a workpiece. When this resistance is met, the hammer may continue to rotate. A spring coupled to the back-side of the hammer causes the hammer to disengage the anvil by axially retreating. Once disengaged, the hammer will advance both axially and rotationally to again engage (i.e., impact) the anvil. When the impact mechanism is operated, the hammer lugs impact the anvil lugs every 180 degrees, for example. Accordingly, when the power tool 100 is impacting during operation, the hammer rotates 180 degrees without the anvil, impacts the anvil, and then rotates with the anvil a certain amount before repeating this process. For further reference on the functionality of the impact mechanism, see, for instance, the impact mechanism discussed in U.S. application Ser. No. 14/210,812, filed Mar. 14, 2014, which is herein incorporated by reference.

The power tool 100 may further include a printed circuit board (PCB) 210 located in the handle 110 and a PCB 212 located in the connection portion 120. One or both of the PCBs 210 and 212 include one or more electronic components that may implement a control system of the power tool 100. In some embodiments, the PCB 212 includes an electronic processor configured to receive power from a power supply connected to the power tool 100 (e.g., a battery pack connected to the power tool 100 via the interface 122). The electronic processor may be configured to control whether power is provided to the light sources and/or the motor 200. The PCB 210 may include switching elements (e.g., field-effect transistors) that are controlled by the electronic processor to selectively provide power to coils of the motor 200 to allow operation thereof. In other embodiments, the PCBs 210 and 212 may include additional or alternative components. For example, the components located on each PCB 210 and 212 as described above may be located on the other PCB 210 and 212.

As can be seen by the cross-sectional view of FIG. 2 (and as shown in further detail in FIGS. 4A and 4B), the secondary housing 130 includes a passageway 215 (e.g., a throughhole) configured to receive one or more wires 220 that are configured to electrically connect to the LEDs to provide power to the LEDs. In some embodiments, an axis through a center of the passageway 215 may be approximately parallel with the axis 202 of the motor 200. In some embodiments, the one or more wires 220 connect to the PCB 210 to receive power from a power supply of the power tool 100. In some embodiments, the power supply that provides power to the LEDs via the one or more wires 220 is a battery pack configured to be connected to the interface 122 of the power tool 100. In some embodiments, the power supply that provides power to the LEDs via the one or more wires 220 is a second power supply separate from the battery pack. For example, the second power supply is a coin cell battery or the like. In some embodiments, the second power supply is configured to provide power to the LEDs but not to the motor 200.

Figure 3:
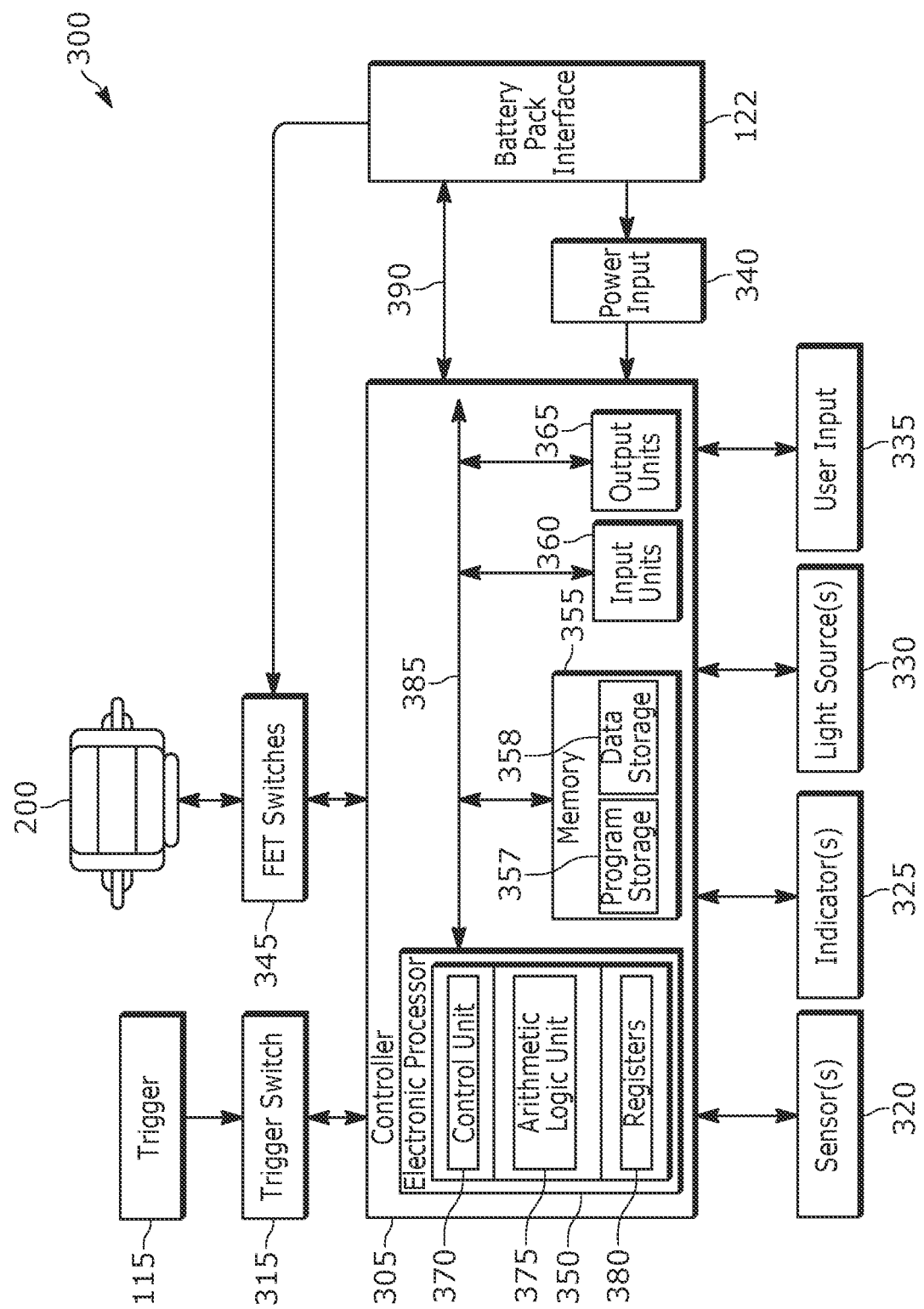
FIG. 3 illustrates a block diagram of the power tool of FIG. 1, according to some embodiments described herein.

FIG. 3 illustrates a block diagram 300 of the power tool 100 according to one example embodiment. The power tool 100 may include a controller 305. The controller 305 is electrically and/or communicatively connected to a variety of modules or components of the power tool 100. For example, as illustrated by FIG. 3, the controller 305 is electrically connected to the motor 200, a battery pack interface 122, a trigger switch 315 (connected to the trigger 115), one or more sensors or sensing circuits 320, one or more indicators 325, one or more light sources 330 (e.g., LEDs), a user input 335 (e.g., switches, buttons, a mode pad, etc.), power input circuitry 340, and switching elements 345 (e.g., FET switches 345). The controller 305 includes combinations of hardware and software that are operable to, among other things, control the operation of the power tool 100, monitor the operation of the power tool 100, activate the one or more indicators 325 and/or light sources 330 (e.g., an LED), etc.

The controller 305 includes a plurality of electrical and electronic components that provide power, operational control, and protection to the components and modules within the controller 305 and/or the power tool 100. For example, the controller 305 includes, among other things, an electronic processor 350 (e.g., a microprocessor, a microcontroller, or another suitable programmable device), a memory 355, input units 360, and output units 365. The electronic processor 350 includes, among other things, a control unit 370, an ALU 375, and a plurality of registers 380 (shown as a group of registers in FIG. 3), and is implemented using a computer architecture (e.g., a modified Harvard architecture, a von Neumann architecture, etc.). The electronic processor 350, the memory 355, the input units 360, and the output units 365, as well as the various modules or circuits connected to the controller 305 are connected by one or more control and/or data buses (e.g., common bus 385). The control and/or data buses are shown generally in FIG. 3 for illustrative purposes. The use of one or more control and/or data buses for the interconnection between and communication among the various modules, circuits, and components would be understood by a person skilled in the art in view of the embodiments described herein.

The memory 355 is a non-transitory computer readable medium and includes, for example, a program storage area 357 and a data storage area 358. The program storage area 357 and the data storage area 358 can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The electronic processor 350 is connected to the memory 355 and executes software instructions that are capable of being stored in a RAM of the memory 355 (e.g., during execution), a ROM of the memory 355 (e.g., on a generally permanent basis), or another non-transitory computer readable medium such as another memory or a disc. Software included in the implementation of the power tool 100 can be stored in the memory 355 of the controller 305. The software includes, for example, firmware, one or more applications, program data, filters, rules, one or more program modules, and other executable instructions. The controller 305 is configured to retrieve from the memory 355 and execute, among other things, instructions related to the control processes and methods described herein. In other constructions, the controller 305 includes additional, fewer, or different components.

The battery pack interface 122 includes a combination of mechanical components (e.g., rails, grooves, latches, etc.) and electrical components (e.g., one or more terminals) configured to and operable for interfacing (e.g., mechanically, electrically, and communicatively connecting) the power tool 100 with a battery pack. For example, power provided by the battery pack to the power tool 100 is provided through the battery pack interface 122 to the power input circuitry 340. The power input circuitry 340 includes combinations of active and passive components to regulate or control the power received from the battery pack prior to power being provided to the controller 305. The battery pack interface 122 may also supply power to the FET switches 345 that are configured to selectively provide power to the motor 200 based in accordance with instructions from the controller 305. The battery pack interface 122 also includes, for example, a communication line 390 configured to allow for communication between the controller 305 and the battery pack.

The indicators 325 include, for example, one or more light-emitting diodes ("LEDs"). The indicators 325 can be configured to display conditions of, or information associated with, the power tool 100. For example, the indicators 325 are configured to indicate measured electrical characteristics of the power tool 100, the status of the device, etc.

The user input 335 is operably coupled to the controller 305 to, for example, select a forward mode of operation or a reverse mode of operation, a torque and/or speed setting for the power tool 100 (e.g., using torque and/or speed switches or a mode pad), etc. In some embodiments, the user input 335 includes a combination of digital and analog input or output devices required to achieve a desired level of operation for the power tool 100, such as one or more knobs, one or more dials, one or more switches, one or more buttons, a mode pad, etc.

In some embodiments, the controller 305 (specifically, the electronic processor 350) is configured to control whether power is provided to the light source(s) 330 (e.g., LEDs 610 shown in FIG. 6 of the lighting assembly 135) via the one or more wires 220. In some embodiments, the controller 305 may receive power from a power supply of the power tool 100 and provide power to the light source(s) 330 directly. In such embodiments, the controller 305 may condition received power as appropriate before providing power to the light source(s) 300. In other embodiments, the light source(s) 330 may be electrically connected to the power supply (e.g., to the battery pack via the battery pack interface 122 and the one or more wires 220) with a switch between the light source(s) 330 and the power supply. In such embodiments, the controller 305 may control the switch to allow or disallow power from be provided to the light source(s) 330. In such embodiments, the electrical path from the power supply to the light source(s) 330 may include conditioning circuitry similar to the power input circuitry 340 to regulate or control the power received by the light source(s) 330 from the power supply. In some embodiments, the controller 305 controls the light source(s) 330 to be illuminated in response to determining that the trigger 115 has been actuated.

The controller 305 may be configured to determine monitor tool conditions using the sensors 320. For example, the controller 305 may be configured to determine whether a fault condition of the power tool 100 is present and generate one or more control signals related to the fault condition. In some embodiments, the sensors 320 include one or more current sensors, one or more speed sensors, one or more Hall Effect sensors, one or more temperature sensors, etc. The controller 305 calculates or includes, within memory 355, predetermined operational threshold values and limits for operation of the power tool 100. For example, when a potential thermal failure (e.g., of a FET, the motor 200, etc.) is detected or predicted by the controller 305, power to the motor 200 can be limited or interrupted until the potential for thermal failure is reduced. If the controller 305 detects one or more such fault conditions of the power tool 100 or determines that a fault condition of the power tool 100 no longer exists, the controller 305 is configured to provide information and/or control signals to another component of the power tool 100 (e.g. the battery pack interface 122, the indicators 325, etc.). In some embodiments, the controller 305 is configured to control an output of the light source(s) 330 to indicate information to a user about a tool condition of the power tool 100 (e.g., by flashing the light source(s) 330 a predetermined number of times to indicate different types of fault conditions).

Figure 4A:
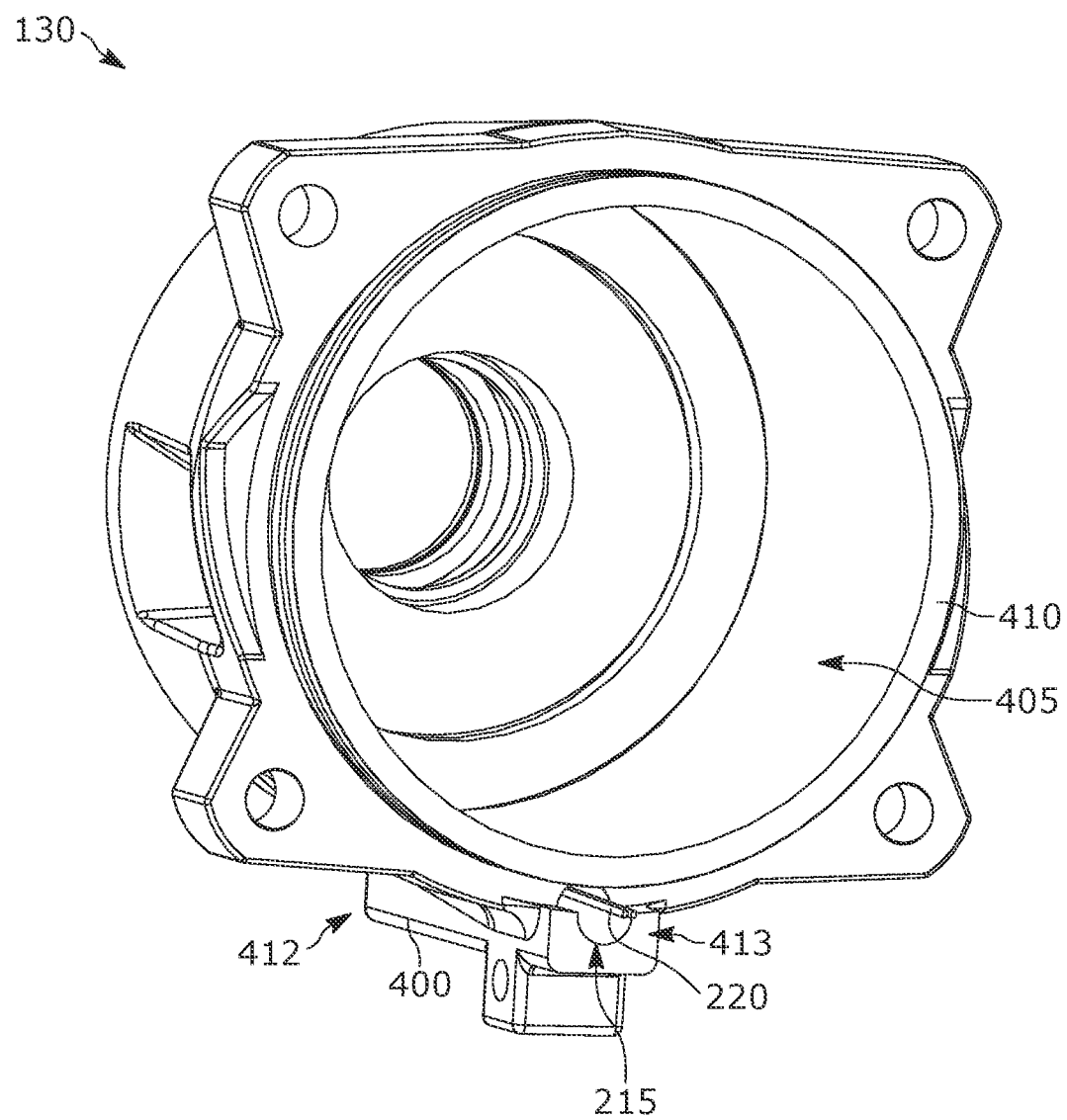
FIG. 4A illustrates a rear perspective view of a secondary housing of the power tool of FIG. 1, according to some embodiments described herein.

FIG. 4A illustrates a rear perspective view of the secondary housing 130 according to one example embodiment. The secondary housing 130 includes a ridge portion 400 (also referred to as a protrusion 400) positioned on an outer peripheral surface of the secondary housing 130. In some embodiments, the ridge portion 400 protrudes outwardly from an outer peripheral surface of the secondary housing 130. In the embodiment shown in FIG. 4A, the ridge portion 400 protrudes downwardly from a bottom of the outer peripheral surface of the secondary housing 130. At least a portion of the passageway 215 is located in the ridge portion 400. As illustrated by FIG. 4A, the one or more wires 220 pass through the passageway 215 such that at least a portion of the one or more wires 220 is located in the passageway 215.

In some embodiments, the secondary housing 130 is ring-shaped to accommodate the output unit 125. A cavity 405 may be formed on a rear surface 410 of the secondary housing 130. At least a portion of the transmission mechanism 205 may be positioned within the cavity 405. The rear surface 410 may include an opening to the cavity 405 such that the cavity 405 intersects with an interior opening of the primary housing 105. In some embodiments, the passageway 215 may include a first end 412 at a front end of the secondary housing 130 and a second end 413 at a rear end of the secondary housing 130. In these embodiments, the second end 413 may be open to the interior opening of the primary housing 105 to allow the one or more wires 220 to enter the primary housing 105 to be electrically connected to a power supply (e.g., a battery pack connected to the power tool 100). For example, upon exiting the passageway 215 and extending rearwardly beyond the rear of the secondary housing 130, the one or more wires 220 may extend downwardly past the trigger switch 315 to connect to the PCB 210 and/or the PCB 212.

Figure 4B:
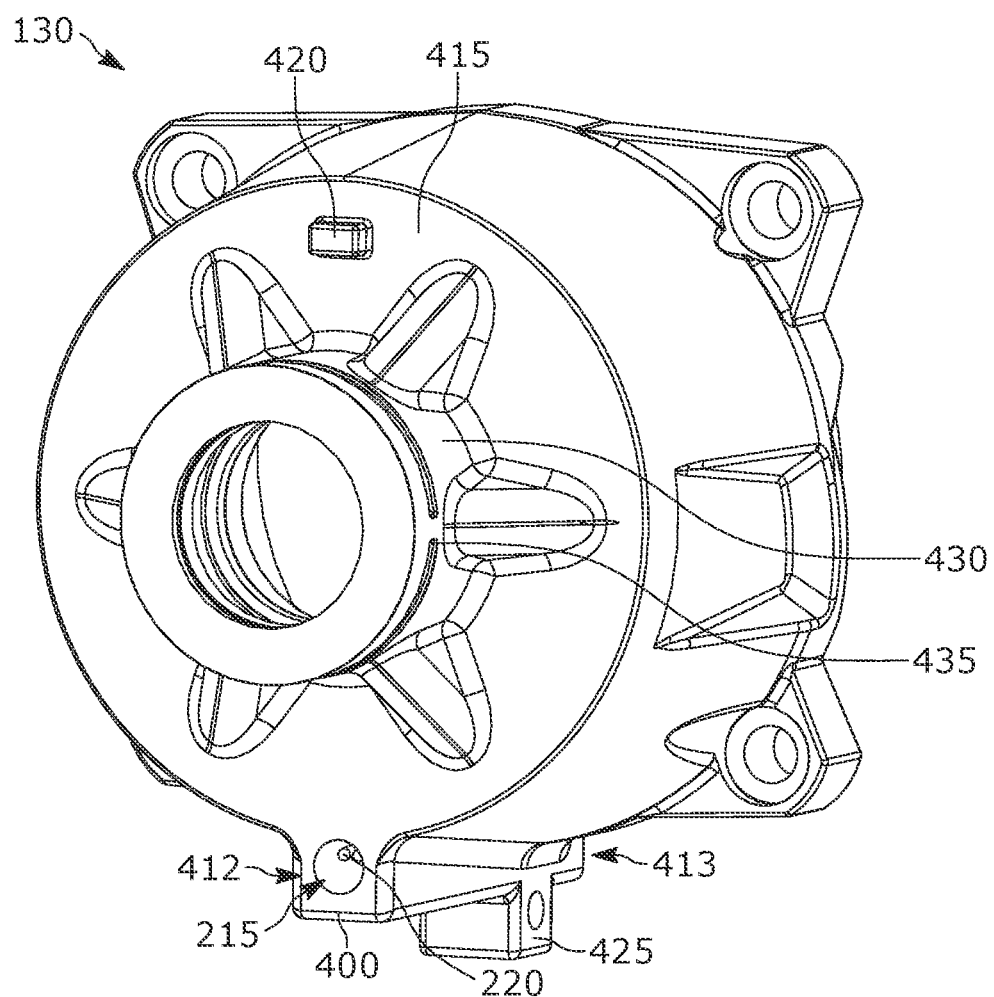
FIG. 4B illustrates a front perspective view of the secondary housing of the power tool of FIG. 1, according to some embodiments described herein.

FIG. 4B illustrates a front perspective view of the secondary housing 130 according to one example embodiment. As illustrated by the front perspective view, the passageway 215 continues along the length of the ridge portion 400 so that the one or more wires 220 may be located along the length of the secondary housing 130. The secondary housing 130 further includes a front surface 415 including a positioning block 420 for positioning the retaining portion 135. The secondary housing 130 further includes at least one mounting lug 425 configured to receive a fastener to at least partially secure the secondary housing 130 to the primary housing 105. In some embodiments, the fastener is configured to be inserted through a first hole in a first clamshell housing portion of the primary housing 105, then through a second hole in the mounting lug 425, and then through a third hole in a second clamshell housing portion of the primary housing 105 to at least partially secure the two clamshell housing portions and the secondary housing 130 together. As shown in FIG. 4B, the mounting lug 425 may protrude (e.g., downwardly) from the ridge portion/protrusion 400.

The secondary housing 130 further includes a neck portion 430 protruding forwardly from the front surface 415. The neck portion 430 may include one or more grooves 435 configured to receive a retention ring 518 (see FIG. 5E). Only a single groove 435 is shown in the embodiment illustrated in FIG. 4B. The combination of the retention ring 518 and the groove 435 may securely hold the retaining portion 135 on the front surface 415 of the secondary housing 130 as explained in greater detail below with respect to FIG. 5E.

Figure 5A:
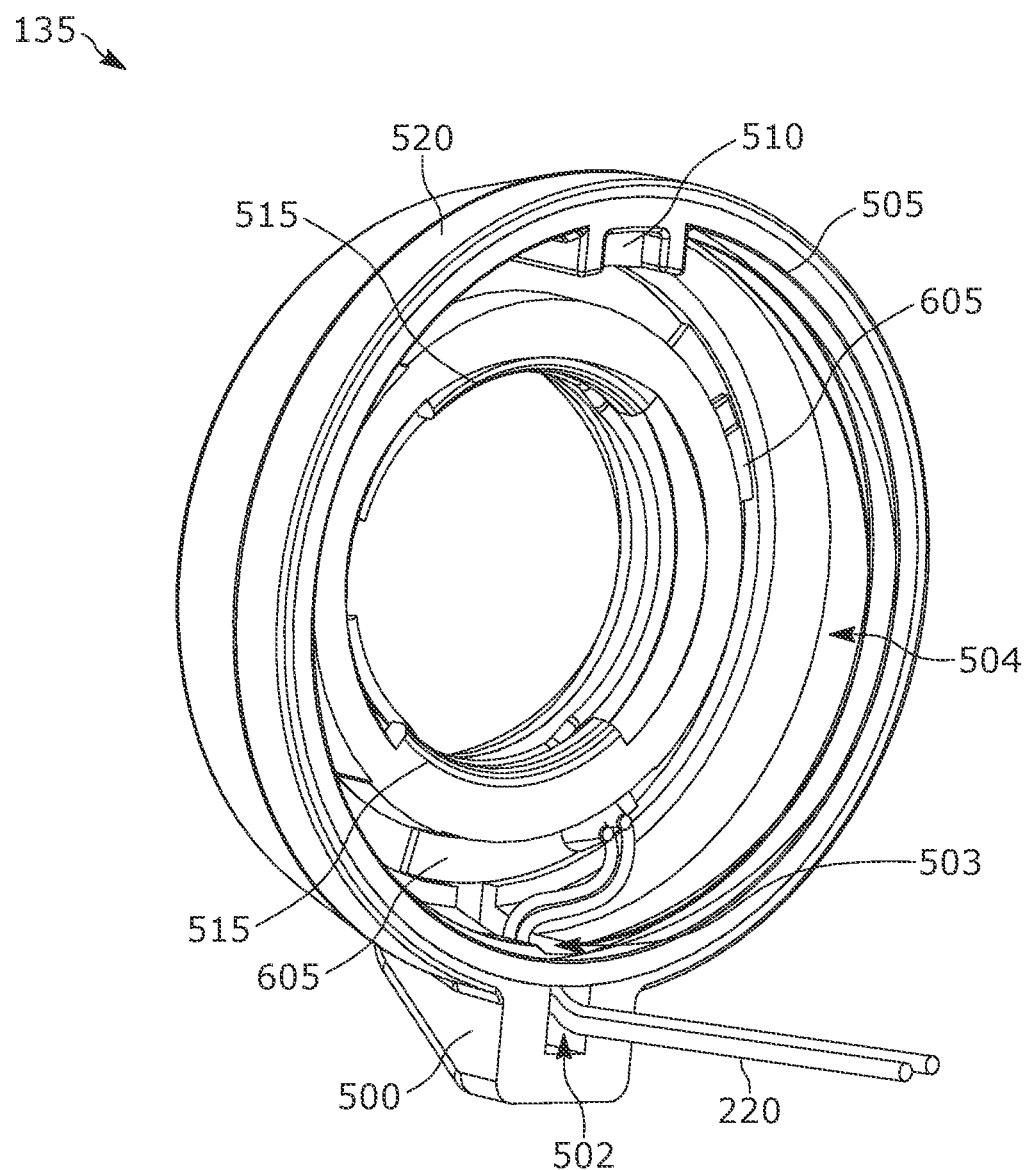
FIG. 5A illustrates a rear perspective view of a retaining portion of the shadowless lighting system of the power tool of FIG. 1, according to some embodiments described herein.
Figure 5B:
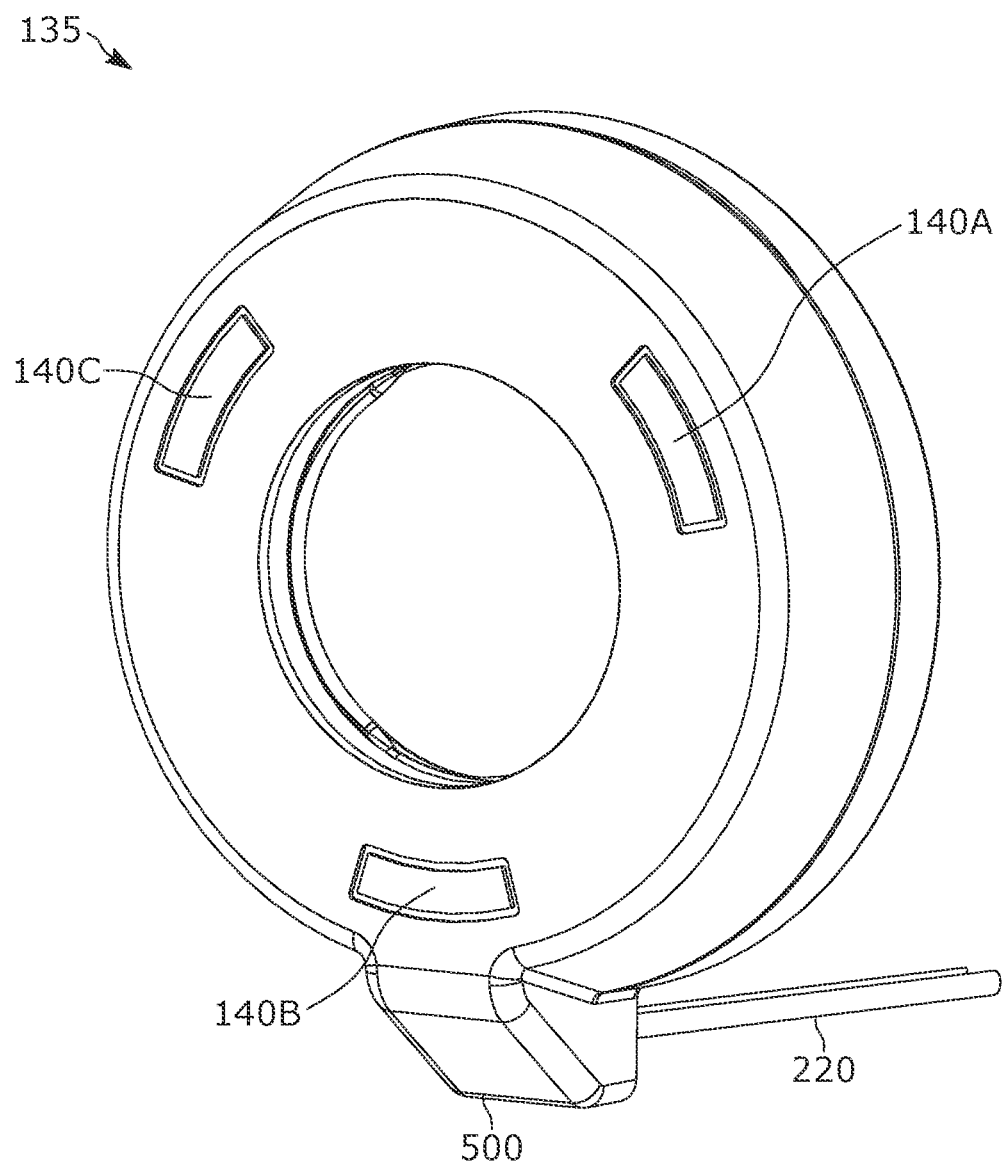
FIG. 5B illustrates a front perspective view of the retaining portion of the shadowless lighting system of the power tool of FIG. 1, according to some embodiments described herein.

FIG. 5A illustrates a rear perspective view of the retaining portion/lighting assembly 135. FIG. 5B illustrates a front perspective view of the retaining portion 135/lighting assembly 135. The retaining portion 135 includes an extension portion 500 protruding (e.g., downwardly) from an outer peripheral surface of the retaining portion 135. The extension portion 500 may generally align with the ridge portion 400 of the secondary housing 130. In some embodiments, the passageway 215 of the secondary housing 130 may align with an exterior opening 502 in the extension portion 500. Additionally, the retaining portion 135 may include an interior opening 503 on a bottom of an inner surface of a cavity 504 of the retaining portion 135. In some embodiments, the one or more wires 220 pass through the passageway 215 of the secondary housing 130, through the exterior opening 502 of the extension portion 500 of the retaining portion 135, and then through the interior opening 503 of the retaining portion 135 to connect to a PCB 605 located in the cavity 504 of the retaining portion 135. In some embodiments, an LED 610 is located on the PCB 605 and receives power from the one or more wires 220 (see FIG. 6).

Figure 5C:
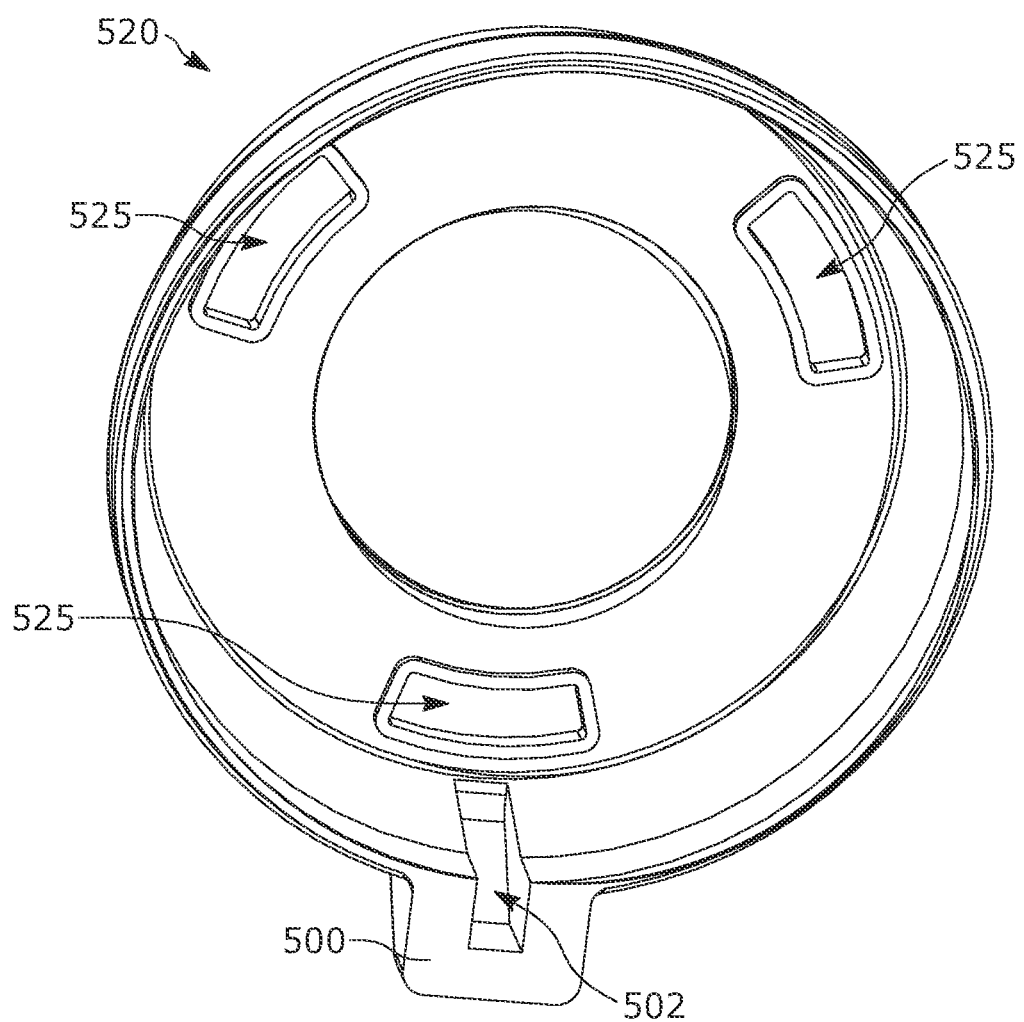
FIG. 5C illustrates a rear perspective view of a cover of the retaining portion of FIGS. 5A and 5B, according to some embodiments described herein.
Figure 5D:
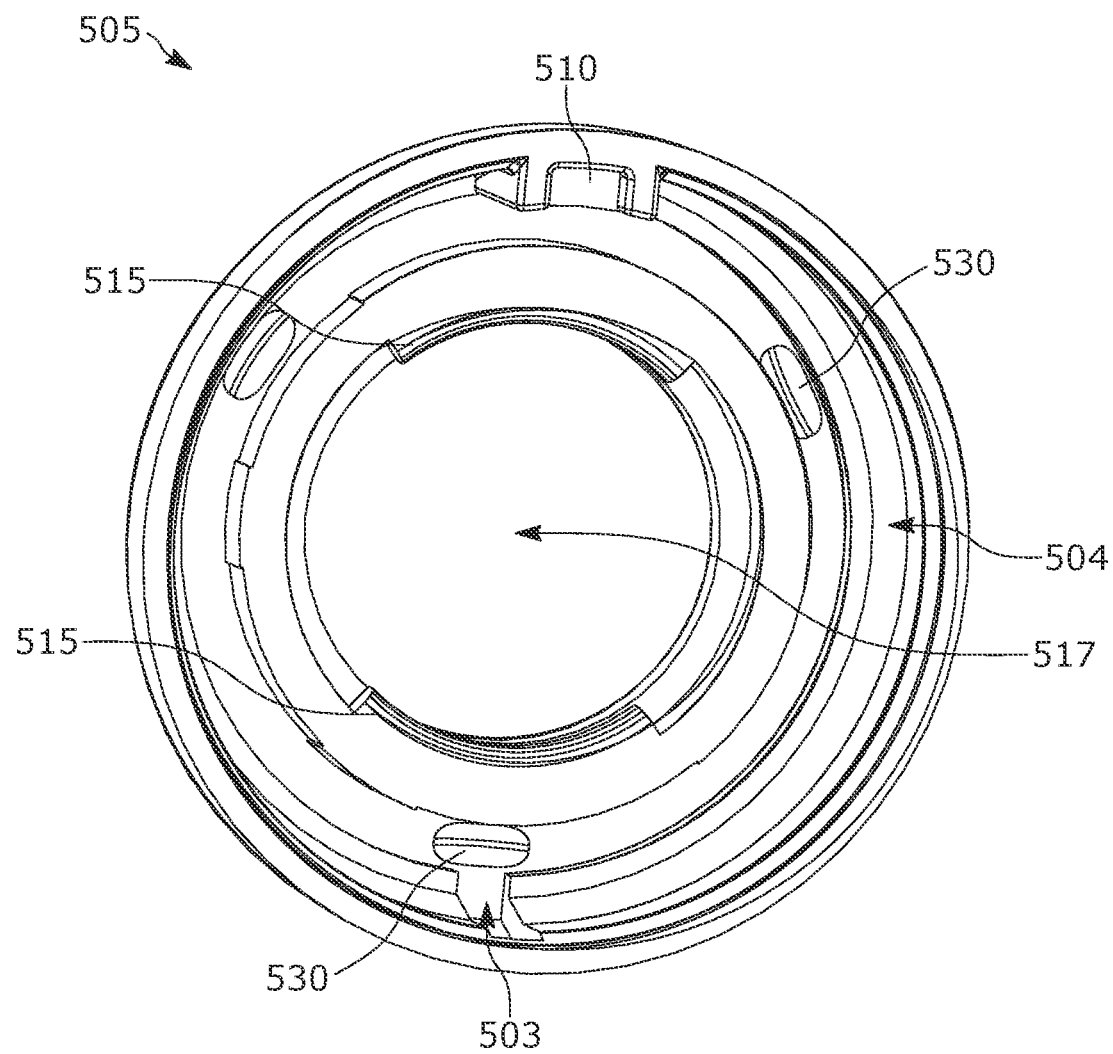
FIG. 5D illustrates a rear perspective view of a light holding device of the retaining portion of FIGS. 5A and 5B, according to some embodiments described herein.

In some embodiments, the retaining portion 135 includes two main elements: an inner portion 505 (i.e., a light holding device 505) as shown in FIG. 5D and an outer portion 520 (i.e., a cover 520) as shown in FIG. 5C. In some embodiments, the cover 520 is made of rubber or plastic and is overmolded onto the light holding device 505. The light holding device 505 may be made of a transparent material, such as a clear plastic, resin, or the like. In some embodiments, the lenses 140 are integral with the light holding device 505. In other words, the light holding device 505 may be made from a single transparent mold that includes multiple lenses 140 so as to prevent separate lenses from needing to being installed within, for example, openings in an opaque light holding device. Using such a single-piece transparent mold for the light holding device 505 simplifies the manufacturing and assembly process of the lighting system for the power tool 100. In some embodiments, each of the lenses 140 protrude axially from a front surface of the light holding device 505 through a respective opening in the cover 520 (see FIG. 5B). In some embodiments, the lenses 140 protrude to be approximately flush with a front surface of the cover 520 (see FIG. 5B). In other embodiments, the lenses 140 protrude forward beyond the front surface of the cover 520.

As illustrated in FIGS. 5B and 5C, the cover 520 of the retaining portion 135 includes three openings 525 to allow a first light source 610A behind lens 140A, a second light source 610B behind lens 140B, and a third light source 610C behind lens 140C to emit light through the cover 520. In some embodiments, the cover 520 prevents light from being emitted through the light holding device 505 in all areas except for through the lenses 140. In other words, the cover 520 may be opaque to prevent light from being emitted through portions of the transparent light holding device 505 except through the lenses 140.

While the retaining portion 135 is shown and described as having two main components (i.e., the light holding device 505 and the cover 520), in other embodiments, these components are combined into a single component. In some of such embodiments, the single-piece retaining portion 135 may be opaque and may include openings configured to receive separate lenses that allow light to be emitted through the openings and the lenses.

Figure 6:
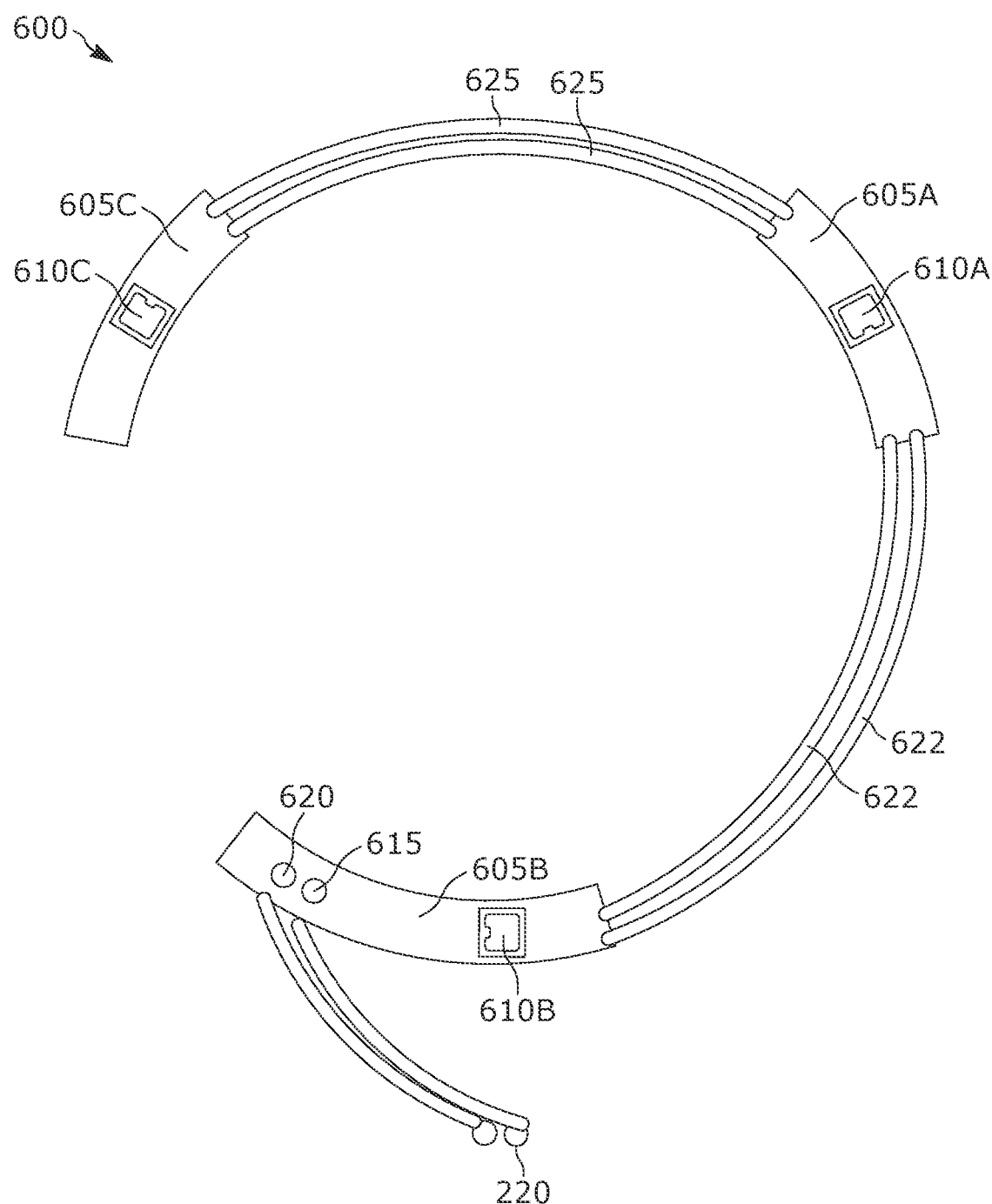
FIG. 6 illustrates a shadowless lighting system of the power tool of FIG. 1, according to some embodiments described herein.

As shown in FIG. 5D, the light holding device 505 may include three indentations 530 that are each configured to provide room for a light source (e.g., an LED 610 as shown in FIG. 6) to protrude into the indentation 530. One indentation 530 may be located behind each lens 140 and/or may form part of each lens 140. The light holding device 505 may also include one or more radially protruding portions 515 that protrude radially toward the output unit 125 and the output axis 202 from an edge of a central opening 517 of the light holding device 505. The one or more radially protruding portions 515 may be configured to secure the retaining portion 135 to the secondary housing 130 (e.g., snap fit to the secondary housing 130) using the retention ring 518 and the groove 435 of the neck portion 430 of the secondary housing 130. For example, protruding portions 519 of the retention ring 518 may be configured to be respectively received in a groove between a radially protruding portion 515 and a rear surface of an edge of the central opening 517 of the light holding device 505.

Figure 5E:
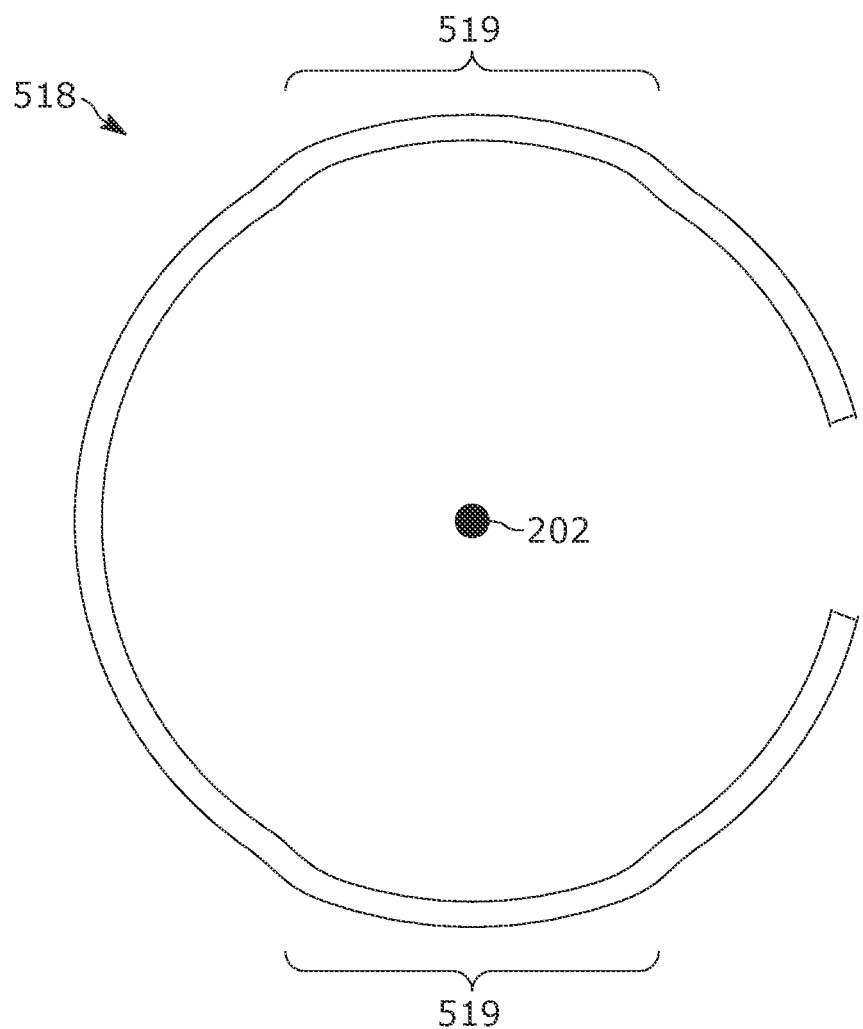
FIG. 5E illustrates a retention ring used to secure the retaining portion of FIGS. 5A and 5B to the secondary housing of FIGS. 4A and 4B according to one example embodiment.

FIG. 5E illustrates the retention ring 518 according to one example embodiment. In some embodiments, the retention ring 518 is approximately circular and may be a fully enclosed ring or a partially enclosed ring as shown in FIG. 5E. The retention ring 518 may include protruding portions 519 that protrude radially away from the output unit 125 and the output axis 202. In some embodiments, a majority of the retention ring 518 is located within the groove 435 of the neck portion 430 of the secondary housing 130. However, the protruding portions 519 may protrude outside of the groove 435 to engage with corresponding radially protruding portions 515 of the light holding device 505 to hold/secure (e.g., snap fit) the light holding device 505 to the secondary housing 130.

Referring back to FIGS. 5A and 5D, in some embodiments, the light holding device 505 includes a positioning gap 510 configured to mate with the positioning block 420 of the secondary housing 130 to properly align the secondary housing 130 and the retaining portion 135. The retaining portion 135 further includes a lighting system 600. The lighting system 600 may be positioned within the cavity 504 of the light holding device 505 such that the lighting system 600 can be mounted to a front end of the power tool 100 and electrically connected to a power supply of the power tool 100 via the one or more wires 220. In some embodiments, the one or more wires 220 terminate within the retaining portion 135, in particular, by connecting to the lighting system 600 as explained below with respect to FIG. 6.

FIG. 6 illustrates a front view of the lighting system 600 according to one example embodiment. The lighting system 600 includes a first PCB 605A including a first LED 610A, a second PCB 605B including a second LED 610B, and a third PCB 605C including a third LED 610C. In alternate embodiments, the first PCB 605A, the second PCB 605B, and the third PCB 605C may be formed as a single annular ring-shaped or substantially ring-shaped PCB. The first LED 610A, the second LED 610B, and the third LED 610C may be positioned such that light emitted by the first LED 610A, the second LED 610B, and the third LED 610C is emitted through a respective lens 140A, 140B, 140C of the transparent light holding device 505. In the embodiment shown, two wires 220 are respectively coupled to each of a first electrical connection junction 615 (e.g., a first soldering point) and a second electrical connection junction 620 (e.g., a second soldering point). Additional wires 622 may electrically connect the second PCB 605B to the first PCB 605A, and additional wires 625 may electrically connect the first PCB 605A to the third PCB 605C. Through the wires 220, 622, and 625 the first PCB 605A, the second PCB 605B, and the third PCB 605C may all receive power from the power supply and/or control signals from the controller 305. In some embodiments, the lighting system 600 includes additional or fewer PCBs 605 and/or LEDs 610. In some embodiments, the PCBs 605 and/or LEDs 610 may be arranged in different locations around the output axis 202. In some embodiments, the light source(s) 330 described above with respect to FIG. 3 include the LEDs 610.

Figure 7:
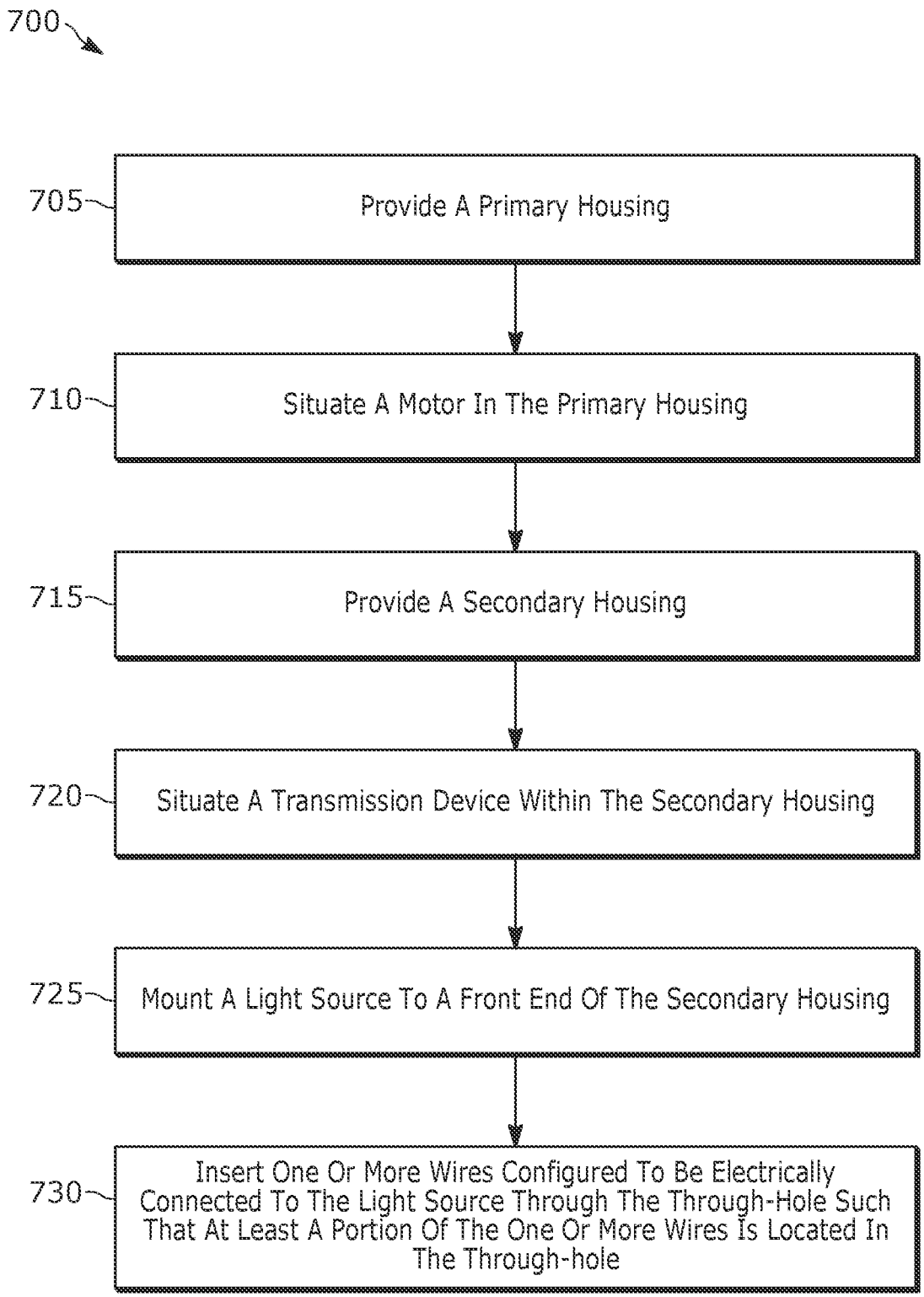
FIG. 7 illustrates a method for manufacturing a power tool including a shadowless lighting system, according to some embodiments described herein.

FIG. 7 illustrates a method 700 for manufacturing a power tool (for example, the power tool 100) including a lighting system (for example, a shadowless lighting system 600). The method 700 includes, at block 705, providing a primary housing (e.g., the primary housing 105). The primary housing 105 may include an interior portion configured to hold various components of the power tool. At block 710, the method 700 also includes situating a motor within the primary housing 105. In some embodiments, the motor is the BLDC motor 200 described previously herein. At block 715, the method 700 also includes providing a secondary housing (e.g., the secondary housing 130). In some embodiments, the secondary housing 130 is formed from metal as described previously herein. In some embodiments, the secondary housing includes the protrusion 400 protruding downwardly from a bottom of an outer peripheral surface of the secondary housing 130 as described previously herein. At block 720, the method 700 also includes situating a transmission device (e.g., transmission device 205) within the secondary housing 130. The transmission device 205 may be configured to transfer rotational energy between the motor 200 and an output unit 125 of the power tool 100 as described previously herein. In some embodiments, at least a portion of the transmission device 205 is situated within the secondary housing 130. The secondary housing 130 may include a passageway 215 as described previously herein. At block 725, the method 700 also includes mounting a light source (e.g., one or more LEDs 610 that may be mounted in a retaining portion 135) to a front end of the secondary housing 130. The light source may be a shadowless lighting system 600 as described previously herein.

At block 730, the method 700 also includes inserting one or more wires (e.g., wires 220) configured to be electrically connected to the light source 610 through the passageway 215 such that at least a portion of the one or more wires 220 is located in the passageway 215. The passageway 215 may begin at the interior portion of the primary housing 105 and terminate at a front end of the secondary housing 130. In some embodiments, at least part of the passageway 215 is located in the protrusion 400 of the secondary housing 130. The passageway 215 may include a first end 412 at the front end of the secondary housing 130 and a second end 413 at a rear end of the secondary housing 130. In some embodiments, inserting the one or more wires 220 through the passageway 215 includes opening the second end 413 to an interior of the primary housing 105, routing the one or more wires 220 through the primary housing 105, and electrically connecting the one or more wires 220 to a power supply.

Figure 8:
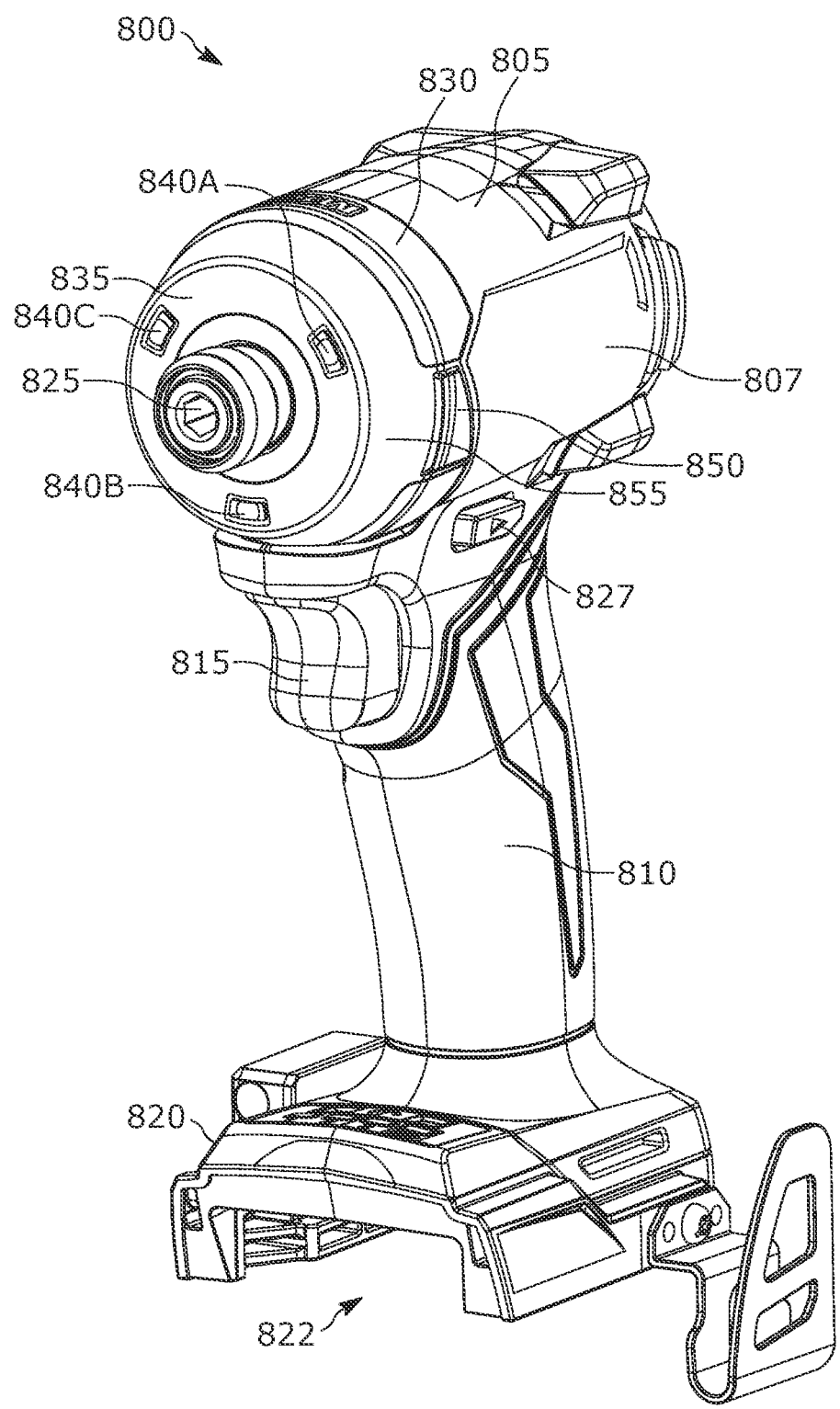
FIG. 8 illustrates another power tool that includes many similar features as the power tool 100 of FIGS. 1-6 and some different features than the power tool of FIGS. 1-6, according to some embodiments described herein.

FIG. 8 illustrates a power tool 800 that includes many similar features as the power tool 100 of FIGS. 1-6 and some different features than the power tool 100 of FIGS. 1-6. For the sake of brevity, many of the similar features will not be explained in detail. Rather, the primary differences between the power tool 100 and the power tool 800 are described in detail below. Features of the power tool 800 that correspond to features of the power tool 100 of FIGS. 1-6 are labeled with either an identical reference number (e.g., trigger switch 315) or a reference number that is increased by 700 (e.g., trigger 115 of the power tool 100 may be similar to trigger 815 of the power tool 800). In some embodiments, the features described below with respect to the power tool 800 may be implemented on corresponding parts of the power tool 100 (e.g., light cover 520 may be overlapped with groove/shoulders in the secondary housing 130 to prevent light bleeding as described below with respect to the power tool 800). Similarly, in some embodiments, the features described previously herein with respect to the power tool 100 may be implemented on corresponding parts of the power tool 800. In some embodiments, the block diagram 300 of FIG. 3 may be representative of the elements of the power tool 800, and the functionality of the power tool 100 as explained previously herein may also apply to the power tool 800.

In some embodiments, the power tool 800 of FIG. 8 includes a primary housing 805 and a secondary housing 830 (e.g., a hammer case, a gear case, or the like). The power tool 800 may also include a retaining portion 835 configured to retain one or more light sources 610 of the power tool 800.

Figure 9A:
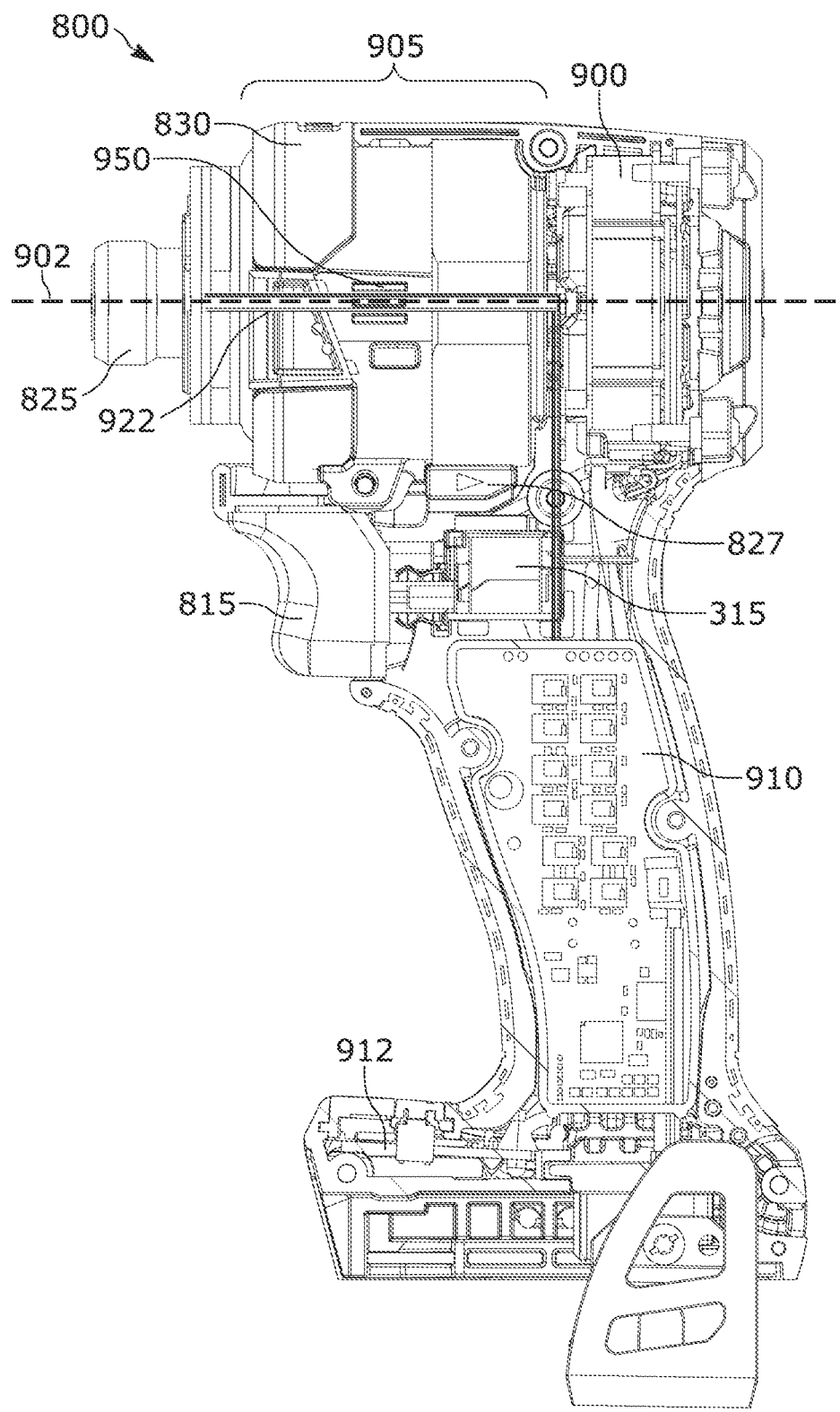
FIG. 9A illustrates a side view of the power tool of FIG. 8 with one half of a clamshell housing removed, with a potting boat removed, and with a retaining portion removed, according to some embodiments described herein.
Figure 9B:
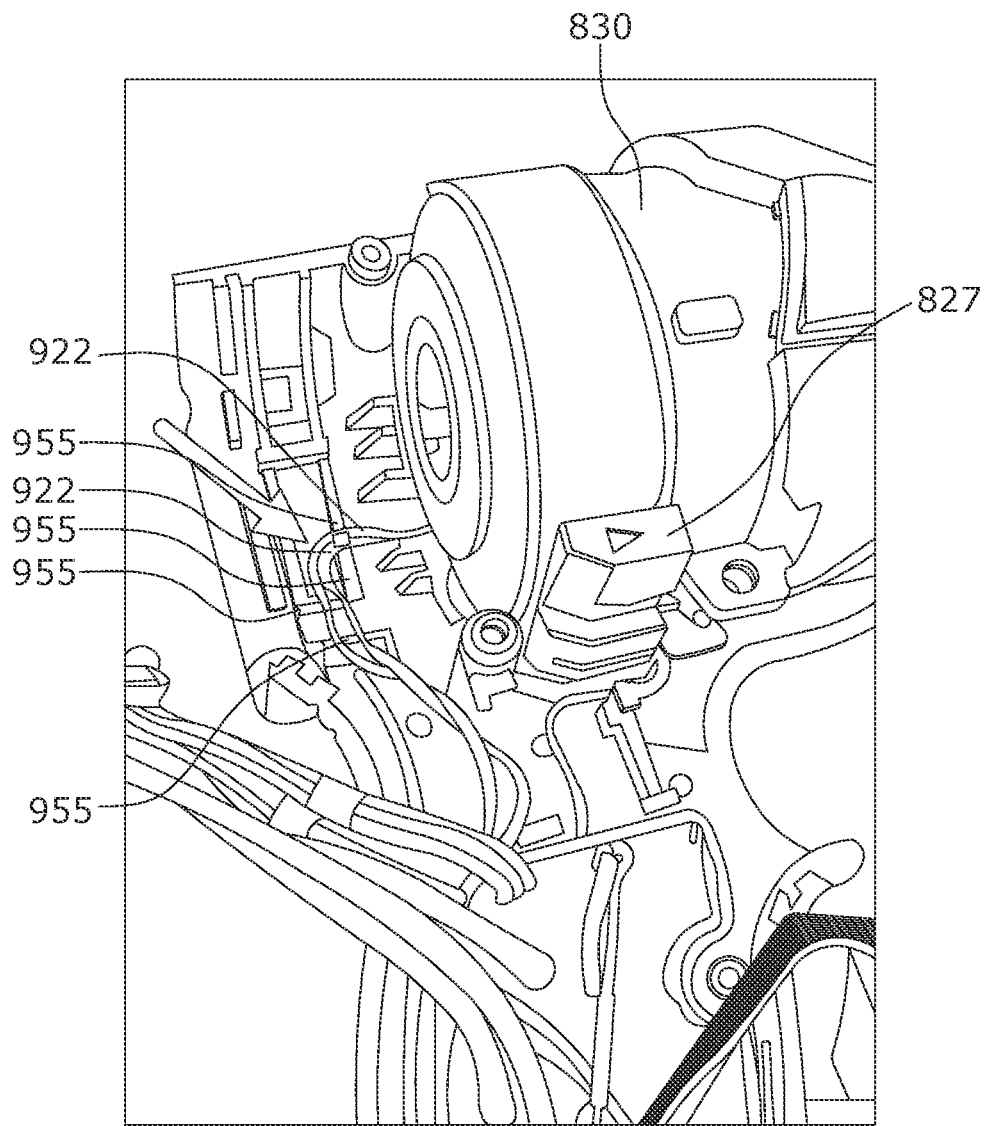
FIG. 9B illustrates a partially disassembled view of the power tool of FIG. 8, according to some embodiments described herein.
Figure 9C:
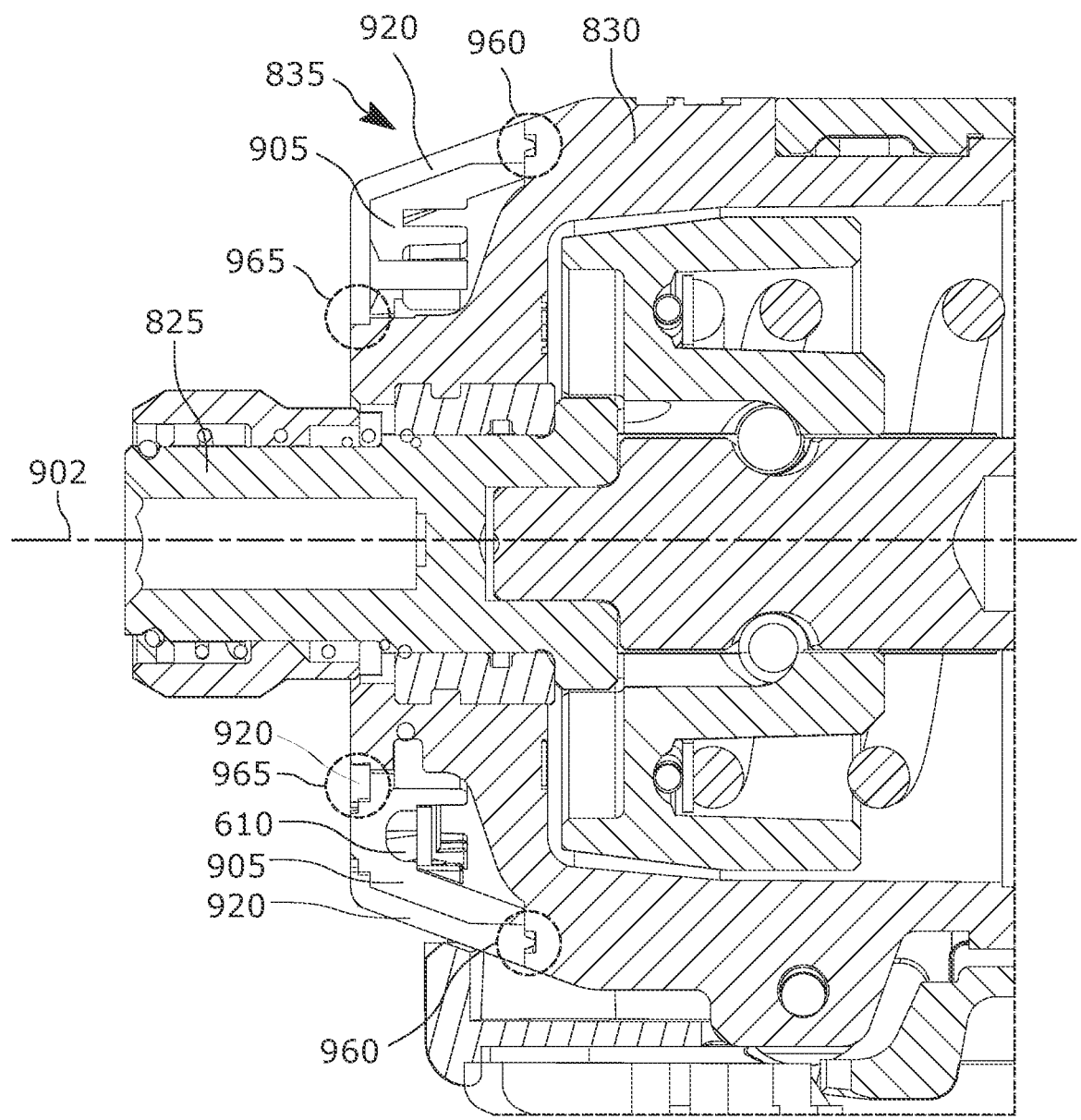
FIG. 9C illustrates a cross-sectional view of a front portion of the power tool of FIG. 8, according to some embodiments described herein.

FIG. 9A illustrates a side view of the power tool 800 of FIG. 8 with one half of a clamshell housing removed, with a potting boat of the PCB 910 removed, and with the retaining portion 835 removed. In FIGS. 9A-9C, features of the power tool 800 that correspond to features of the power tool 100 of FIGS. 1-6 are labeled with a reference number that is increased by 700 (e.g., motor 200 of the power tool 100 may be similar to motor 900 of the power tool 800). In some embodiments, LED power wires 922 may be similar to LED power wires 220. As shown in FIG. 9A, in some embodiments, the secondary housing 830 may not have a passageway 215 configured to house the one or more wires 922 that provide power to the light sources 610. Similarly, the retaining portion 835 may not include openings 502, 503 configured to received the one or more LED power wires 922. Rather, as shown in FIG. 9A, one or more wires 922 electrically connected to the light source 610 are routed along an outer peripheral side of the secondary housing 830 until the one or more wires 922 pass a rear end of the secondary housing 830 at which point the one or more wires 922 are routed downwardly toward a handle 810 of the power tool 800.

When looking at the front of the power tool 800, the one or more wires 922 shown in FIG. 9A run along a right outer peripheral side of the secondary housing 830 at approximately a three o'clock position. In some embodiments, the one or more wires 922 may alternatively run along a left outer peripheral side of the secondary housing 830 at approximately a nine o'clock position. In some embodiments, the one or more wires 922 may run along an outer peripheral surface of the secondary housing 830 at any location above the three o'clock position and the nine o'clock position. In some of any of the these embodiments, the one or more wires 922 may not be routed downwardly toward the handle 810 until the one or more wires pass the rear end of the secondary housing 830.

Figure 13A:
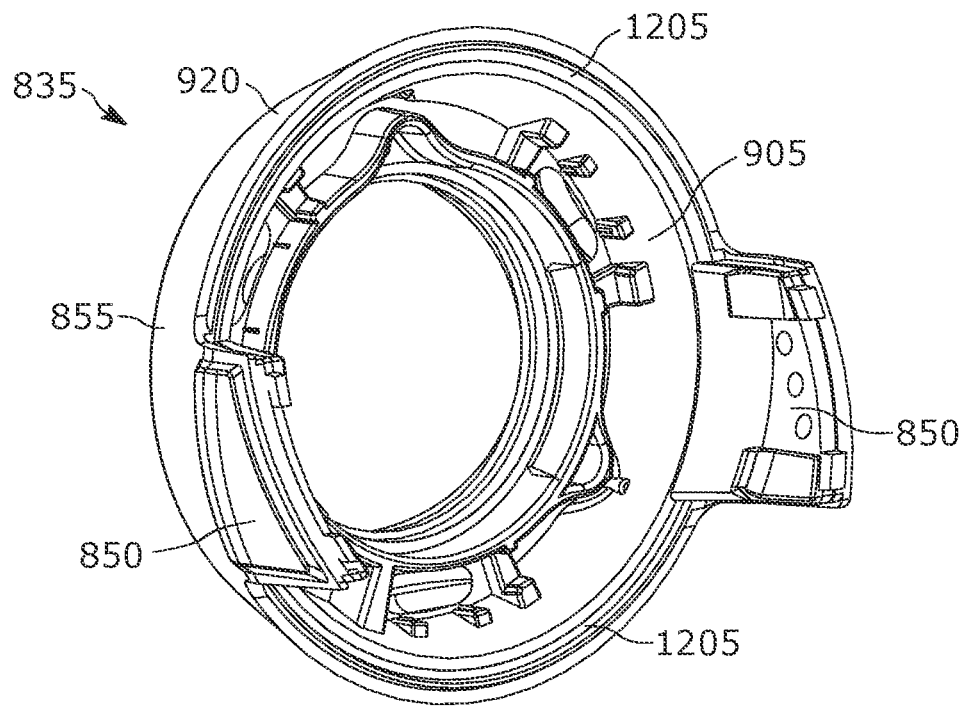
FIG. 13A illustrates a rear perspective view of the retaining portion of the power tool of FIG. 8, according to some embodiments described herein.

In some embodiments, the retaining portion 835 includes wings 850 (see FIGS. 8 and 13A) that protrude axially rearward from a main portion 855 of the retaining portion 835 toward a rear of the secondary housing 830 along an outer peripheral side surface of the secondary housing 830. In some embodiments, a circular/partially cylindrical portion of the retaining portion 835 in which the light sources 610 are mounted may be considered the main portion 855 of the retaining portion 835 from which the wings 850 extend. In some embodiments, one of the wings 850 extends over the top of the one or more wires 922 as they run along the outer peripheral side of the secondary housing 830 to protect the one or more wires 922 (e.g., from debris, tampering, etc.). In some embodiments, the wing 850 that extends over the top of the one or more wires 922 may not support the one or more wires 922. Rather, the outer peripheral side of the secondary housing 830) may include one or more first wire guides 950 in which the one or more wires 922 is configured to be friction fit (see FIG. 9A). Additionally or alternatively, an interior surface of the primary housing 805 (e.g., an interior surface of a part of the clamshell housing) may include a second wire guide 955 in which the one or more wires 922 is configured to be friction fit (see FIG. 9B). In some embodiments, the second wire guide 955 is rearward of the secondary housing 830 in a direction along the output axis 902 (see FIG. 9B). In some embodiments, the interior surface of the primary housing 805 includes an additional or alternative second wire guide 955 that is adjacent to the outer peripheral side of the secondary housing 830. As shown in FIG. 9B, the second wire guides 955 may route the one or more wires 922 rearwardly in a direction that is approximately parallel to the output axis 902 and/or downwardly toward the handle 810 in a direction that is approximately perpendicular to the output axis 902.

In some embodiments, the one or more wires 922 connect to a power supply as explained previously herein with respect to the one or more wires 220.

FIG. 9C illustrates a cross-sectional view of a front portion of the power tool 800. As shown in FIG. 9C, the retaining portion 835 may include an inner portion/light holding device 905 and an outer portion/cover 920 that are respectively similar to the inner portion/light holding device 505 and the outer portion/cover 520 described previously herein with the exception of the differences explained below. In some embodiments, the secondary housing 830 and the cover 920 include areas of overlap 960, 965 to prevent/reduce light bleeding that may occur when a flat rear end of a cover merely abuts a flat front surface of the secondary housing. In other words, when flat surfaces of the cover and the secondary housing merely abut each other, light from the light sources 610 may bleed/leak out from a small opening between the cover and the secondary housing. Such light bleeding/leaking reduces the amount of light that is emitted forward toward a work area and may give a user a perception that the power tool was poorly designed/assembled. Accordingly, there is a problem with existing methods of mounting a light retaining portion on a secondary housing of a power tool.

Figure 10A:
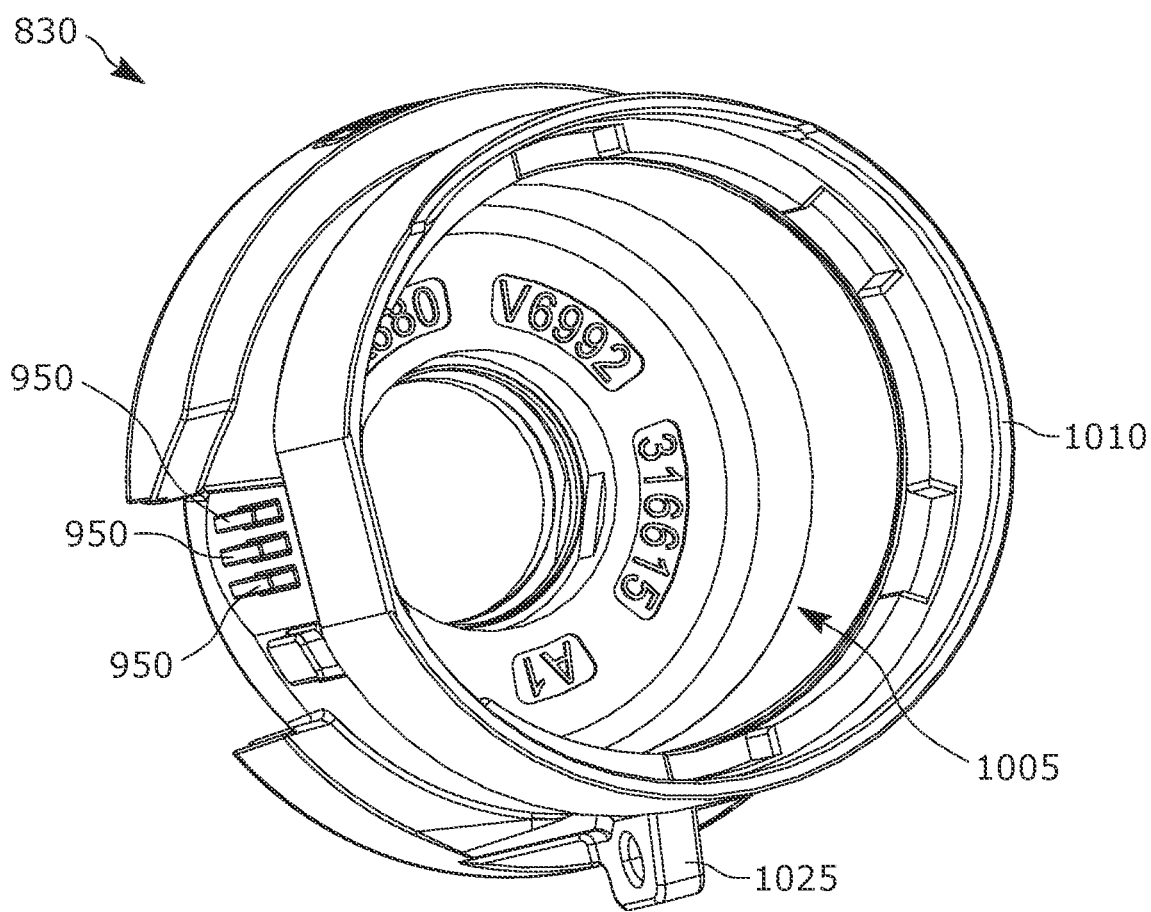
FIG. 10A illustrates a rear perspective view of a secondary housing of the power tool of FIG. 8, according to some embodiments described herein.
Figure 10B:
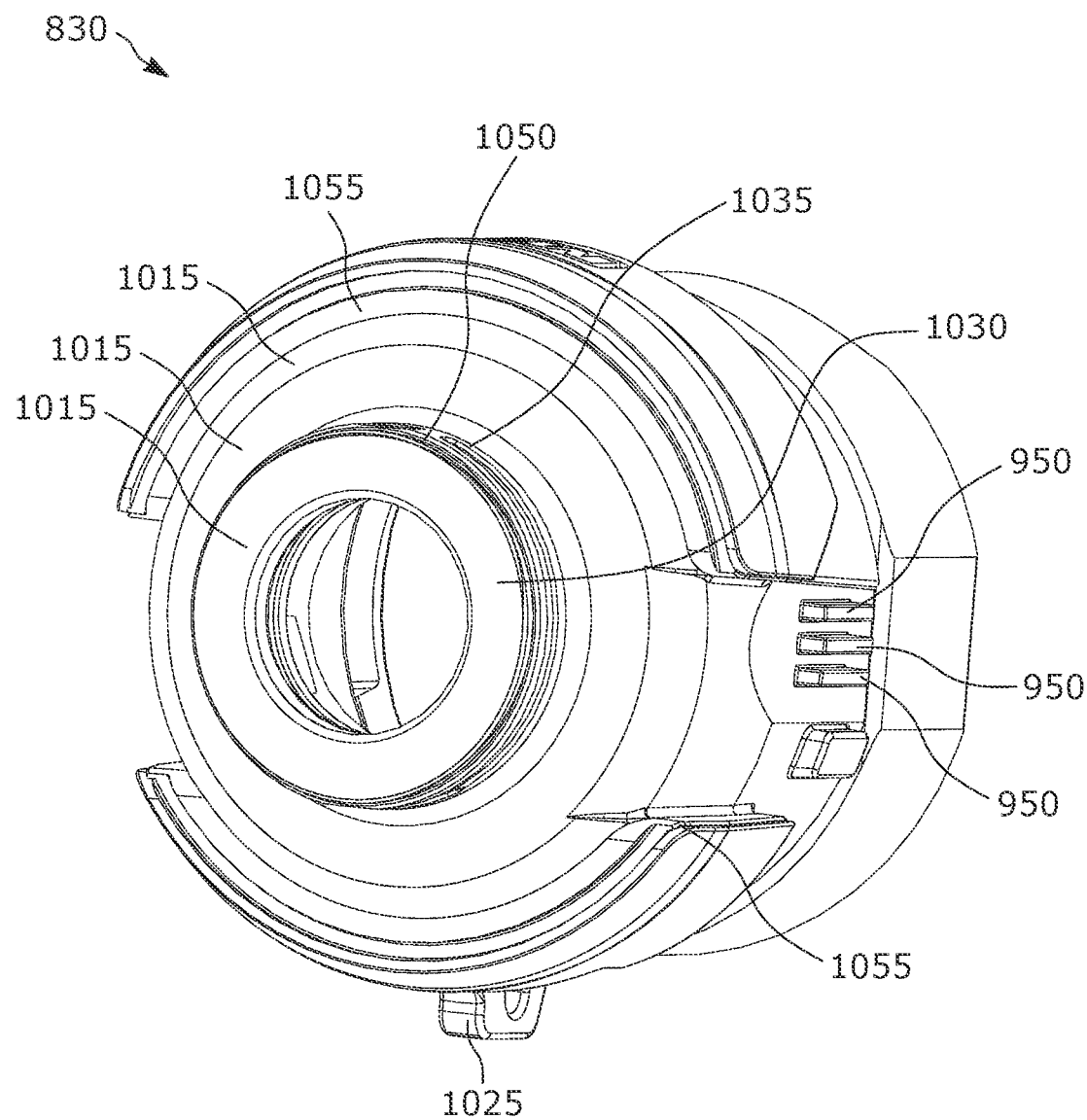
FIG. 10B illustrates a front perspective view of the secondary housing of the power tool of FIG. 8, according to some embodiments described herein.
Figure 12A:
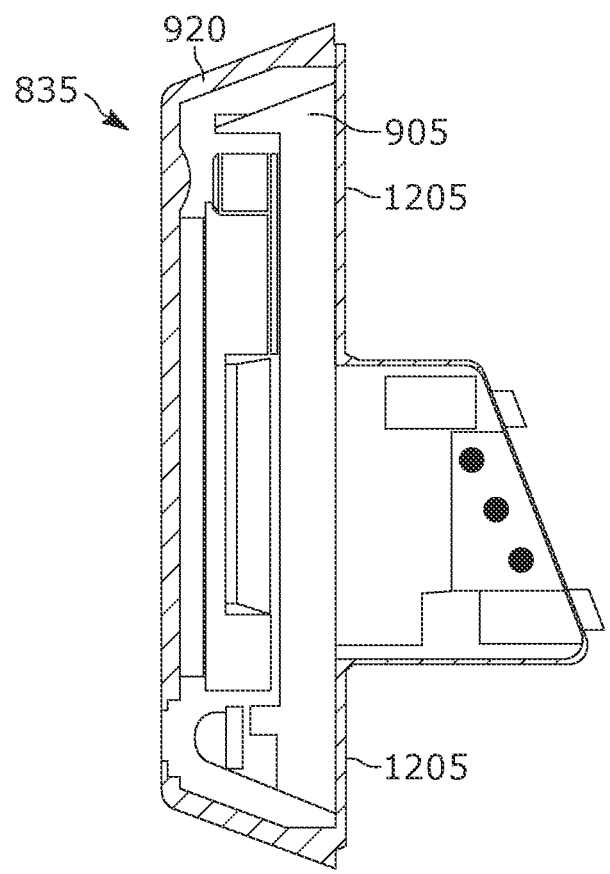
FIG. 12A illustrates a cross-sectional view of the retaining portion of the power tool of FIG. 8, according to some embodiments described herein.
Figure 12B:
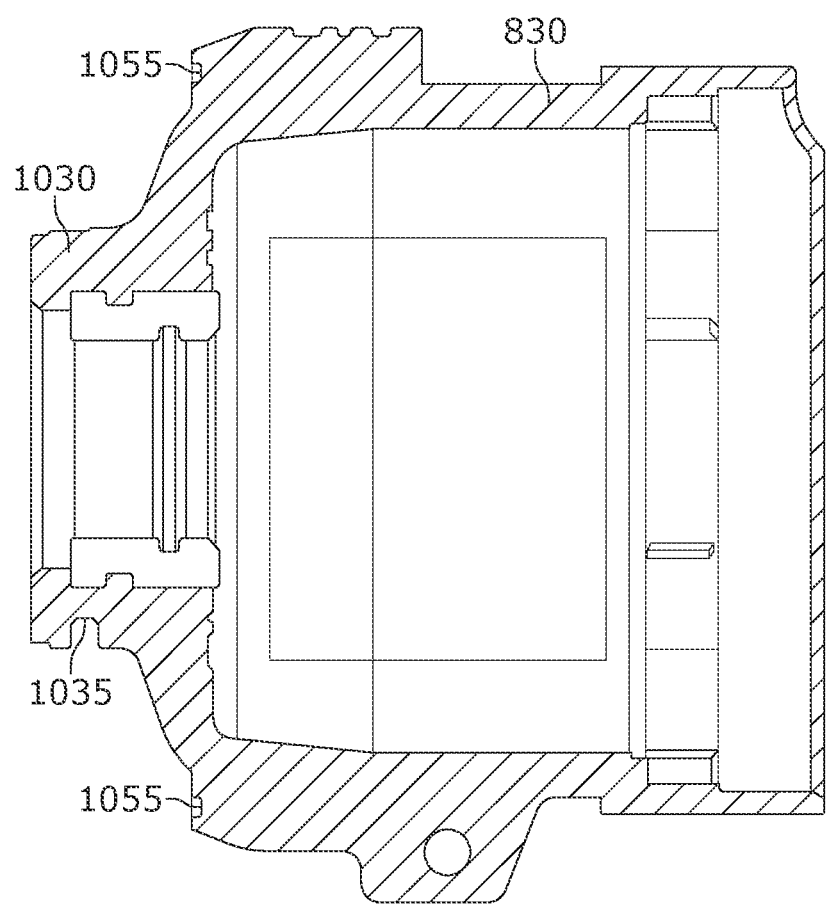
FIG. 12B illustrates a cross-sectional view of the secondary housing of the power tool of FIG. 8, according to some embodiments described herein.
Figure 13B:
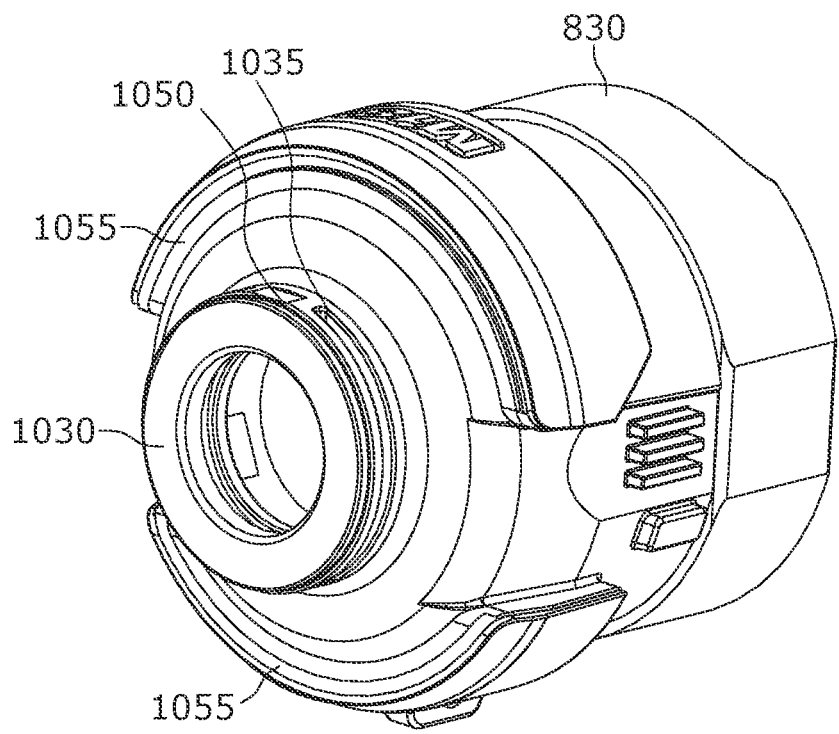
FIG. 13B illustrates a front perspective view of the secondary housing of the power tool of FIG. 8, according to some embodiments described herein.

The power tool 800 addresses this problem by using a secondary housing 830 that includes a first groove 1055 on a front surface 1015 of the secondary housing 830 (see FIGS. 10B, 12B, and 13B). The first groove 1055 may be configured to receive a rearwardly protruding part 1205 of the cover 920 that protrudes rearwardly further than the main portion 855 of the light holding device 905 (see FIGS. 12A and 13A). For example, the rearwardly protruding part 1205 protrudes rearwardly in the same direction as the wings 850 but may be included on the approximately half-circle-shaped portions of the main portion 855 of the retaining portion 835 (see FIG. 13A). In some embodiments, the protruding part 1205 continues along the wings 850 (see FIGS. 12A and 13A) and is configured to fit in a continued portion of the first groove 1055 that continues rearwardly on an outer peripheral side of the secondary housing 830 (see FIG. 10B). In some embodiments, the combination of the first groove 1055 and the protruding part 1205 create the areas of overlap 960 as shown in FIG. 9C to prevent/reduce light bleeding/leaking between the cover 920 and the secondary housing 830 in a radial direction perpendicular to the output axis 902.

Figure 11A:
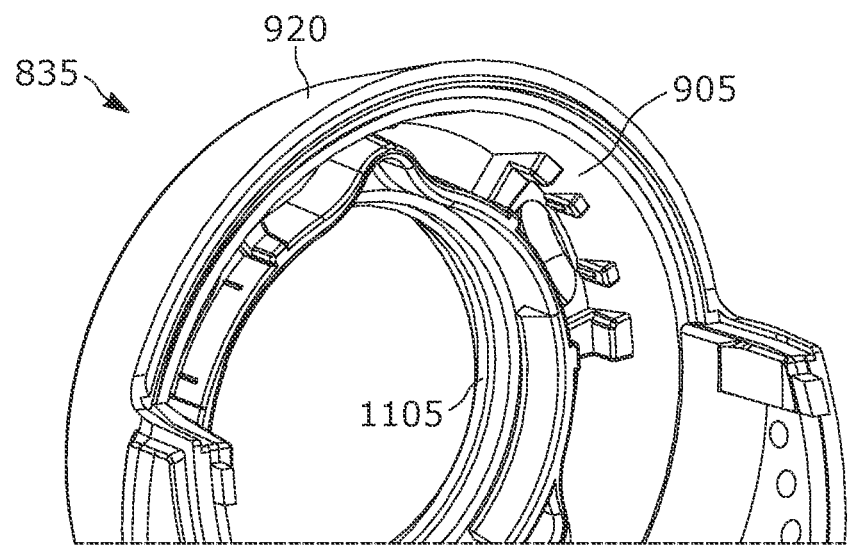
FIG. 11A illustrates a perspective view of a portion of a retaining portion of the power tool of FIG. 8, according to some embodiments described herein.
Figure 11B:
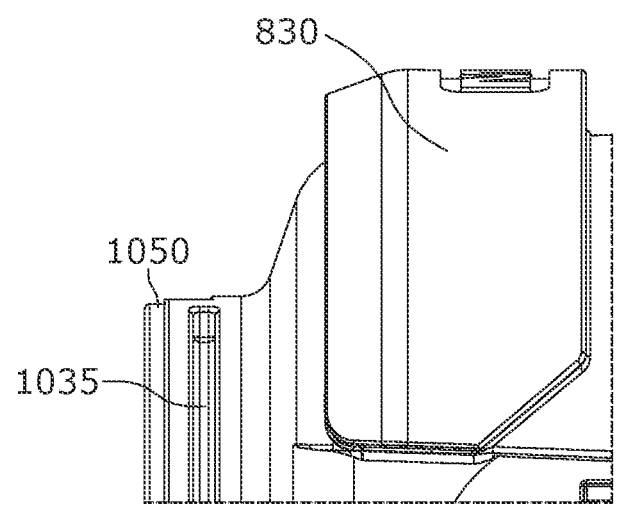
FIG. 11B illustrates a side view of a portion of the secondary housing of the power tool of FIG. 8, according to some embodiments described herein.

The power tool 800 may further address the light bleeding/leaking problem described above by using a secondary housing 830 that includes a neck portion 1030 that includes a shoulder 1050 on an outer peripheral surface of the neck portion 1030 (see FIGS. 10B and 11B). The shoulder 1050 may be configured to receive an overhanging part 1105 of the cover 920 that protrudes radially closer to an output axis 902 of the output unit 825 than a front surface of the light holding device 905 (see FIG. 11A). As shown in FIG. 11B, in some embodiments, the shoulder 1050 includes a groove/indent toward the output axis 902 at a front end of the neck portion 1030 of the secondary housing 830. Although FIGS. 11A and 11B show only a portion of the cover 920 and the secondary housing 830, in some embodiments, the overhanging part 1105 of the cover 920 and the shoulder 1050 of the secondary housing 830 are fully circular. In some embodiments, the combination of the overhanging part 1105 and the shoulder 1050 create the areas of overlap 965 as shown in FIG. 9C to prevent/reduce light bleeding/leaking between the cover 920 and the secondary housing 830 in a forward direction parallel to the output axis 902.

Figure 14A:
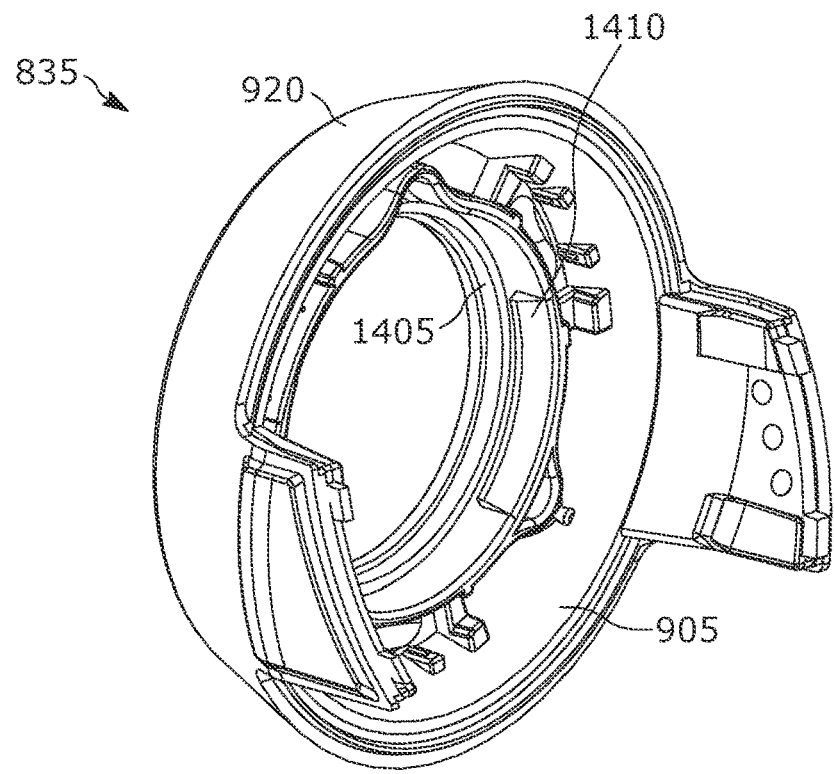
FIG. 14A illustrates another rear perspective view of the retaining portion of the power tool of FIG. 8, according to some embodiments described herein.
Figure 14B:
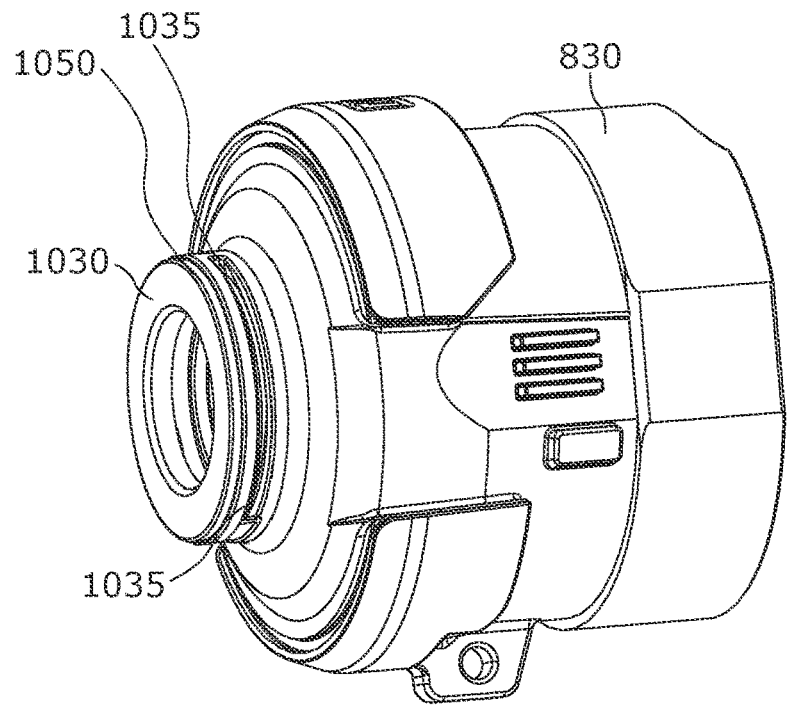
FIG. 14B illustrates another front perspective view of the secondary housing of the power tool of FIG. 8, according to some embodiments described herein.

FIGS. 14A and 14B illustrate perspective views of the retaining portion 835 and the secondary housing 830 with portions of each that are involved in securing the retaining portion 835 to the secondary housing 830 highlighted. In some embodiments, the power tool 800 includes a retention ring 1518 (see FIG. 15) located in a second groove 1035 in the secondary housing 830 (e.g., on an outer peripheral surface of the neck portion 1030 of the secondary housing 830). In some embodiments, the second groove 1035 is similar to the groove 435 explained previously herein with respect to the power tool 100 except that the second groove 1035 is discontinued at approximately the twelve o'clock position instead of being discontinued as approximately the three o'clock position. In some embodiments, the light holding device 905 includes two first protruding portions 1405 and 1410 that protrude radially toward the output axis 902. In some embodiments, the protruding portion 1410 is similar to the protruding portion 515 described previously herein with respect to the power tool 100. Although FIG. 14A shows a single protruding portion 1410, another protruding portion 1410 may be symmetrically located on an opposite side of the inner surface of the light holding device 905 to receive the symmetrical protruding portions 1519 of the retention ring 1518 (see FIG. 15). The protruding portion 1405 may be a fully circular protrusion in some embodiments.

Figure 15:
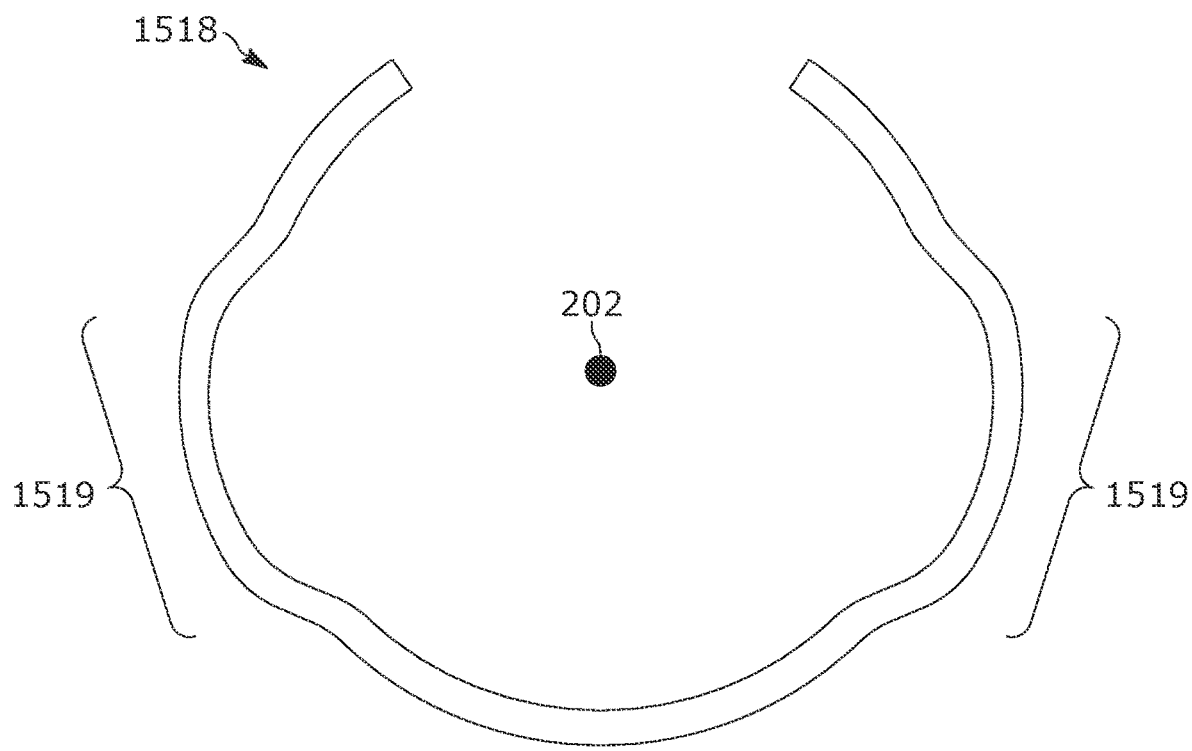
FIG. 15 illustrates a retention ring of the power tool of FIG. 8 that is used to secure the retaining portion of the power tool of FIG. 8 to the secondary housing of the power tool of FIG. 8, according to one example embodiment.

In some embodiments, the retention ring 1518 includes two second protruding portions 1519 that protrude radially away from the output axis 902 (and out of the second groove 1035) and that respectively engage with the two first protruding portions 1405, 1410 of the light holding device 905 to secure the light holding device 905 to the secondary housing 830 (see FIG. 15). In some embodiments, the second protruding portions 1519 protrude in opposite directions than each other and are approximately symmetrical to each other about a plane that passes through the output axis 902. In some embodiments, the retention ring 1518 is similar to the retention ring 518 described previously herein with respect to the power tool 100 except that one of the second protruding portions 1519 protrudes leftward and the other of the second protruding portions 1519 protrudes rightward instead of protruding upward and downward as in the power tool 100. In some embodiments, due to the shapes of the retention ring 518, 1518, the groove 435, 1035, and the protruding portions 515, 1405, 1410, the retention ring 518, 1518 is hidden from the view of a user when the retaining portion 135, 835 is secured to the secondary housing 830.

In some embodiments, the second groove 1035 is less than 365 degrees around the neck portion 1030 of the secondary housing 830. For example, as shown in FIG. 14B, the second groove 1035 is discontinued at the twelve o'clock position such the second groove 435 does not form a complete circle around the neck portion 1030. In some embodiments, the retention ring 1518 is a partially enclosed ring that is not a fully enclosed ring (see FIG. 15). In some embodiments, the second groove 1035 forms a complete circle around the neck portion 1030. In some embodiments, the retention ring 1518 is a fully enclosed ring.

Figure 16A:
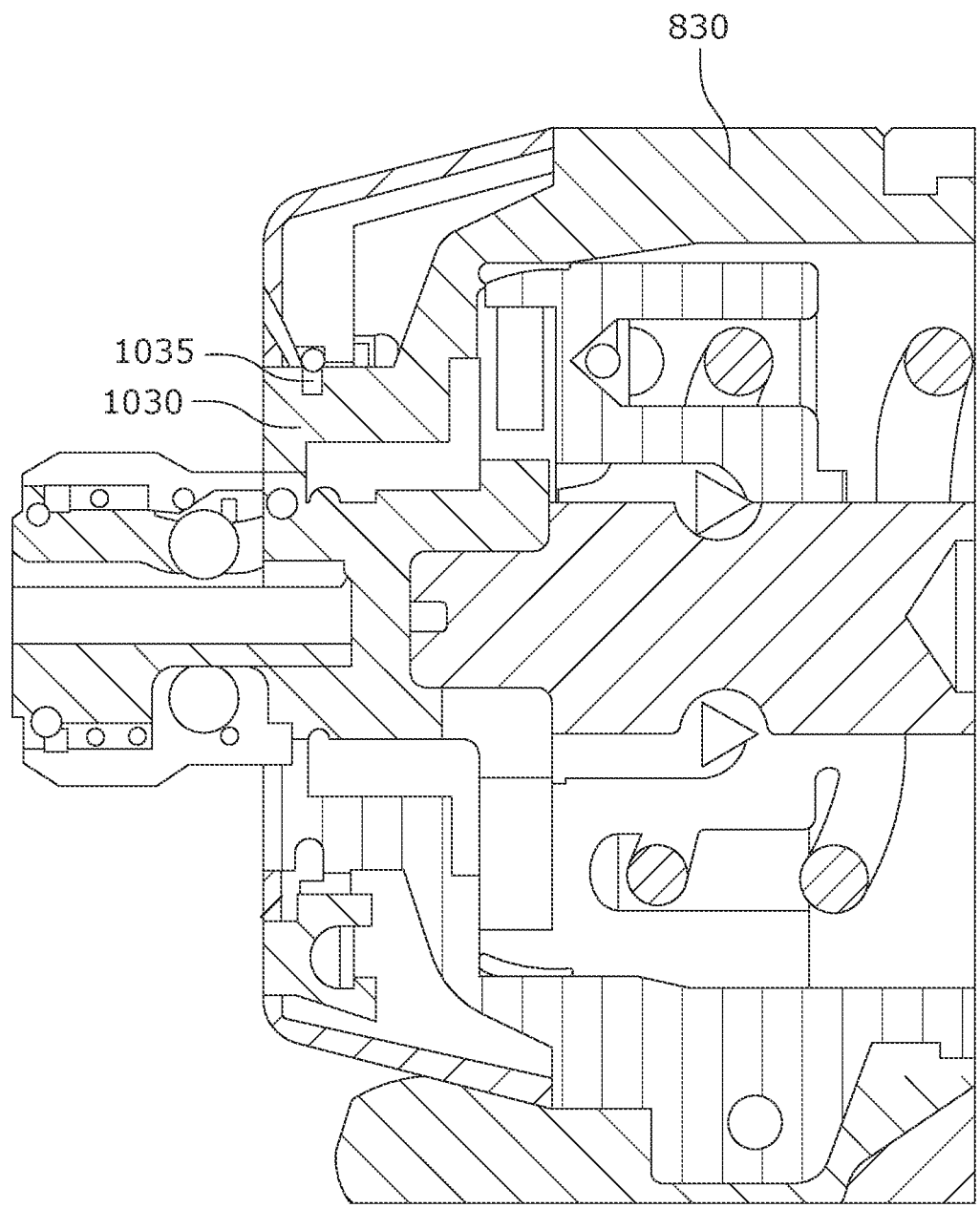
FIGS. 16A and 16B illustrate cross-sectional views of a front portion of the power tool of FIG. 8 with a second groove configured to receive the retention ring of FIG. 15 in different locations, according to some example embodiments.
Figure 16B:
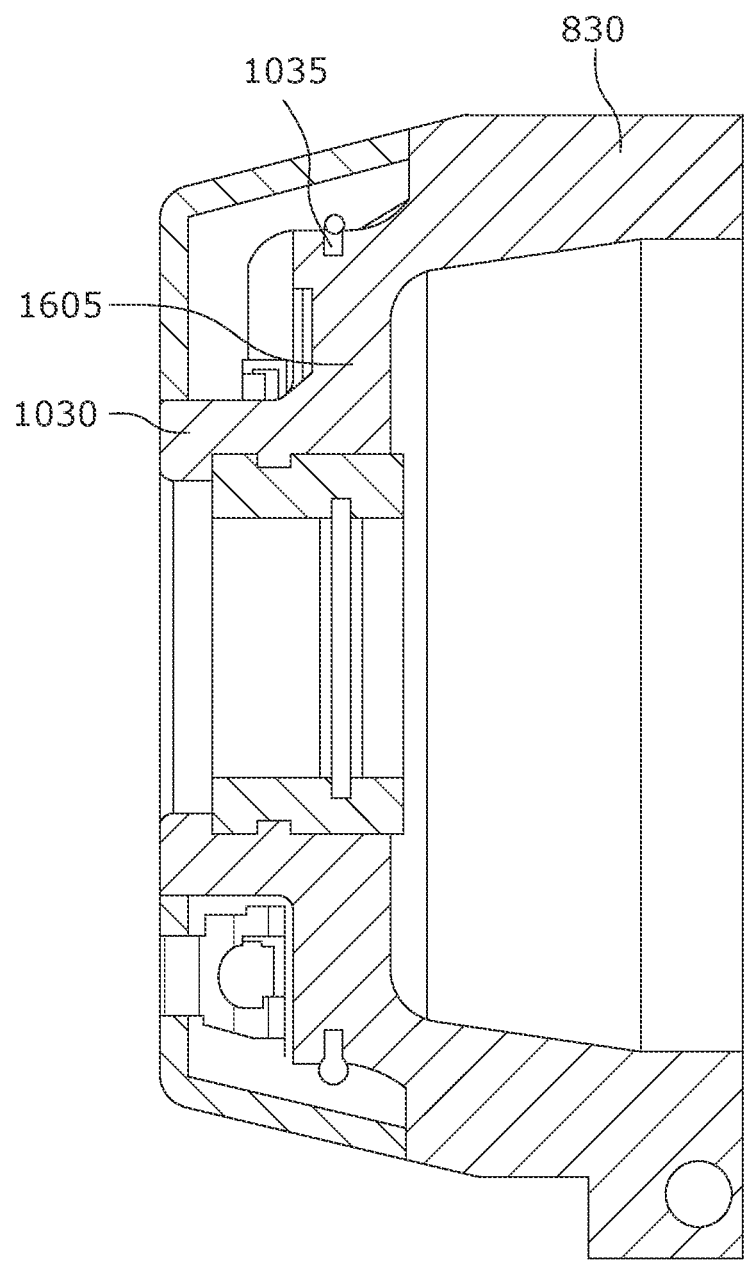

In some embodiments, the second groove 1035 used to retain the retention ring 1518 may be located in a different location on the secondary housing 830 than described previously herein. FIGS. 16A and 16B illustrate cross-sectional views of a front portion of the power tool 800 with the second groove 1035 in different locations. In FIG. 16A, the second groove 1035 is located on an outer peripheral surface of the neck portion 1030 of the secondary housing 830 similar to the second groove 1035 shown in FIG. 14B. In FIG. 16B, the second groove 1035 is located on an outer peripheral surface of a forward axially protruding front face 1605 of the secondary housing 830. These alternate locations similarly apply to the groove 435 of the power tool 100.

Thus, embodiments described herein provide a power tool including a lighting system, and more specifically, a shadowless lighting system. Various features and advantages are set forth in the following claims.

What is claimed is:

1. A power tool comprising:
a primary housing;
a motor situated within the primary housing;
a transmission mechanism configured to transmit rotational energy from the motor to an output unit of the power tool;
a secondary housing in which at least a portion of the transmission mechanism is located, the secondary housing including an outer peripheral surface and a protrusion protruding outwardly from the outer peripheral surface;
a light holding device mounted to a front end of the secondary housing and configured to cover a portion of the secondary housing;
a light source configured to be held by the light holding device;
a passageway through the secondary housing, wherein at least part of the passageway is located in the protrusion; and
one or more wires electrically connected to the light source, the one or more wires extending through the passageway and into an interior of the primary housing.

2. The power tool of claim 1, wherein the protrusion protrudes downwardly from a bottom of the outer peripheral surface of the secondary housing.

3. The power tool of claim 2, wherein the secondary housing includes a mounting lug configured to receive a fastener to at least partially secure the primary housing to the secondary housing; and
wherein the mounting lug protrudes from the protrusion.

4. The power tool of claim 1, wherein an axis through a center of the passageway is approximately parallel with an axis of the motor; and
wherein the secondary housing includes one of a hammer case and a gear case.

5. The power tool of claim 1, wherein the light source includes a plurality of LEDs arranged about an output axis about which the output unit of the power tool rotates.

6. The power tool of claim 1, wherein the passageway includes a first end at a front surface of the secondary housing and a second end at a rear end of the secondary housing; and
wherein the one or more wires extend forward beyond the front surface of the secondary housing to electrically connect to the light source.

7. The power tool of claim 1, wherein at least a portion of a length of the passageway is fully enclosed around an axis through a center of the passageway.

8. The power tool of claim 1, wherein a first portion of the passageway at the front end of the secondary housing is fully enclosed around an axis through a center of the passageway, and wherein a second portion of the passageway rearward of the first portion is not fully enclosed around the axis through the center of the passageway.

9. The power tool of claim 1, wherein the passageway includes a through-hole that passes through a front surface of the secondary housing.

10. A power tool comprising:
a primary housing;
a motor situated within the primary housing;
a transmission mechanism configured to transmit rotational energy from the motor to an output unit of the power tool;
a secondary housing configured to house the transmission mechanism;
a light holding device mounted to a front end of the secondary housing and configured to over a portion of the secondary housing;
a light source configured to be held by the light holding device;
a through-hole through a front surface of the secondary housing; and
one or more wires electrically connected to the light source, the one or more wires extending through the through-hole to an interior of the primary housing to be electrically connected to a power supply of the power tool, wherein the one or more wires extend forward beyond the front surface of the secondary housing to electrically connect to the light source.

11. The power tool of claim 10, wherein the secondary housing includes an outer peripheral surface and a protrusion protruding outwardly from the outer peripheral surface; and
wherein at least part of the through-hole is located in the protrusion.

12. The power tool of claim 10, wherein the through-hole includes a first end at the front end of the secondary housing and a second end at a rear end of the secondary housing.

13. The power tool of claim 10, wherein at least a portion of a length of the through-hole is fully enclosed around an axis through a center of the through-hole.

14. The power tool of claim 10, wherein a first portion of the through-hole at the front end of the secondary housing is fully enclosed around an axis through a center of the through-hole, and wherein a second portion of the through-hole rearward of the first portion is not fully enclosed around the axis through the center of the through-hole.

15. A power tool comprising:
a primary housing;
a motor situated within the primary housing;
a transmission mechanism configured to transmit rotational energy from the motor to an output unit of the power tool;
a secondary housing configured to house the transmission mechanism;
a light holding device mounted to a front end of the secondary housing;
a light source configured to be held by the light holding device; and
a cover configured to cover at least a portion of a front surface of the light holding device;
di device is made of a al to provide a lens that is device;

wherein the light holding device is made of a transparent material to provide a lens that is integral with the light holding device;

wherein the cover is made of an opaque material and is configured to prevent light from being emitted through the light holding device expect for through the lens, wherein the secondary housing includes a first groove on a front surface of the secondary housing, the first groove configured to receive a rearwardly protruding part of the cover that protrudes further rearward than a main portion of the light holding device; and wherein the secondary housing includes a neck portion that includes a shoulder on an outer peripheral surface of the neck portion, the shoulder configured to receive an overhanging part of the cover that protrudes radially closer to an output axis of the output unit than the front surface of the light holding device.

16. The power tool of claim 15, further comprising a retention ring located in a second groove in the secondary housing;

wherein the light holding device includes two first protruding portions that protrude radially toward the output axis; and wherein the retention ring includes two second protruding portions that protrude radially away from the output axis and that respectively engage with the two first protruding portions of the light holding device to secure the light holding device to the secondary housing.

17. The power tool of claim 16, wherein the second groove is less than 360 degrees around the neck portion of the secondary housing; and wherein the retention ring is a partially enclosed ring that is not a fully enclosed ring.

18. The power tool of claim 16, wherein the second groove is located on one of the outer peripheral surface of the neck portion of the secondary housing and an outer peripheral surface of a front face of the secondary housing.

19. The power tool of claim 16, wherein the second protruding portions protrude in opposite directions than each other and are approximately symmetrical to each other about a plane that passes through the output axis.

20. The power tool of claim 15, further comprising a through-hole through the secondary housing, wherein one or more wires electrically connected to the light source pass through the through-hole.

* * * * *